US006486830B1

United States Patent
Kohno et al.

(10) Patent No.: US 6,486,830 B1
(45) Date of Patent: Nov. 26, 2002

(54) DIRECTIONAL ANTENNA APPARATUS

(75) Inventors: Ryuji Kohno, 1202-9, Hazawa-cho, Kanagawa-ku, Yokohama-shi, Kanagawa (JP); Tomonori Sugiyama, Mishima (JP); Hiroki Mochizuki, Numazu (JP)

(73) Assignees: Toshiba Tec Kabushiki Kaisha, Tokyo (JP); Ryuji Kohno, Yokohama (JP)

( * ) Notice: Subject to any disclaimer, the term of this patent is extended or adjusted under 35 U.S.C. 154(b) by 0 days.

(21) Appl. No.: 09/644,601

(22) Filed: Aug. 23, 2000

(30) Foreign Application Priority Data

Aug. 26, 1999 (JP) ............................................. 11-240009
Aug. 26, 1999 (JP) ............................................. 11-240011

(51) Int. Cl.[7] .............................. G01S 3/16; G01S 3/28
(52) U.S. Cl. ....................................... 342/383; 342/380
(58) Field of Search ................................. 342/380, 383, 342/372, 373, 157, 158

(56) References Cited

U.S. PATENT DOCUMENTS 4,217,586 A   8/1980   McGuffin 6,087,986 A * 7/2000 Shoki et al. ................ 342/383

FOREIGN PATENT DOCUMENTS

JP           9-219615         8/1997

* cited by examiner

*Primary Examiner*—Theodore M. Blum
(74) *Attorney, Agent, or Firm*—Frishauf, Holtz, Goodman & Chick, P.C.

(57) ABSTRACT

Signals received by antenna elements are respectively converted to lower frequency signals by the frequency converters. The lower frequency signals are then converted to the digital signals by A/D converters and supplied to a digital signal processing unit. The digital signal processing unit weights the digitized signals on the amplitude and the phase for each signal for optimally controlling the directivity. The weighted signals from the digital signal processing unit are converted to the analog signals by D/A converters and added by an adder. The added signal is then converted by a frequency converter to an original frequency of the received signals by the antenna elements.

33 Claims, 27 Drawing Sheets

DIRECTIONAL ANTENNA APPARATUS

CROSS-REFERENCE TO RELATED APPLICATIONS

This application is based upon and claims the benefit of priority from the prior Japanese Patent Applications No. 11-240009, filed Aug. 26, 1999; and No. 11-240011, filed Aug. 26, 1999, the entire contents of which are incorporated herein by reference.

BACKGROUND OF THE INVENTION

The present invention relates to a directional antenna apparatus used in, for example, a base station of a radio communications system for data communications between the base station and a plurality of terminal stations.

In a radio communications system for e.g. mobile communications or indoor radio communications, adaptive array antennas are commonly provided for effective use of the limited frequencies, suppression of the multipath phasing, or elimination of interference waves over a single channel. For example, as disclosed in Jpn. Pat Appln. KOKAI Publication No. 9-219615, an adaptive array transmitting/receiving apparatus equipped with an adaptive array antenna is provided in the base station in a radio communications system for communications between the base station and the terminal stations.

That is, the device disclosed in the publication is structured in the following manner. Amplitudes and phases of transmitted/received signals from a plurality of antenna elements are weighted by a weighting apparatus 2, and transmitting signals from a transmitting/receiving unit 3 for performing modulating/demodulation on signals are split at a divider/adder and amplitudes and phases thereof are weighted at the weighting apparatus 2 so that they are output to the antenna elements 1. Also, an adaptive array transmitting/receiving apparatus for weighting amplitudes and phases of received signals from the antenna elements 1 at the weighting apparatus 2 and combining the weighted signals at the divider/adder 4 to output them to the transmitting/receiving unit 3 is provided at a base station. At a time of providing the base station, reference signals are transmitted to the adaptive array transmitting/receiving apparatus from a direction of desired wave and a direction of undesired wave, a coefficient of weight is calculated at an external calculating device 5 on the basis of the received signals of the reference signals of the adaptive array transmitting/receiving apparatus, and the coefficient of weight is set to the weighting apparatus 2 via an interface 6, so that directional control is performed.

Conventionally, in a case that an adaptive array antenna is employed as an antenna, since a transmitter/receiver for a base station or a terminal station is structured as a base station or a terminal station equipped with an adaptive array transmitting/receiving apparatus at an initial stage of equipment, there does not occur any problem. However, when an adaptive array antenna is intended to be employed for a base station or a terminal station which is equipped with the existing radio device without employing such an adaptive array antenna, there occurs a problem that, since the existing transmitter/receiver of the base station or the terminal station can not be reused as the equipment for the adaptive array antenna, the entire system of the base station or the terminal station must be changed.

It is hence an object of the present invention to provide a directional antenna apparatus which can be easily connected to the existing radio apparatus not employing an adaptive array antenna.

BRIEF SUMMARY OF THE INVENTION

According to the present invention, a directional antenna apparatus having an plurality of antenna elements for controlling the directivity is provided comprising: first receiving frequency converting means for converting the frequency of signals received by the antenna elements; weighting means for weighting on the amplitude and the phase for the signals converted by the first receiving frequency converting means; adding means for adding the weighted signals by the weighting means; and second receiving frequency converting means for converting back the frequency of the added signal to the original frequency of the received signals.

As a result, the directional antenna apparatus of the present invention can easily be connected to an existing radio apparatus, which does not employ an adaptive array antenna.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
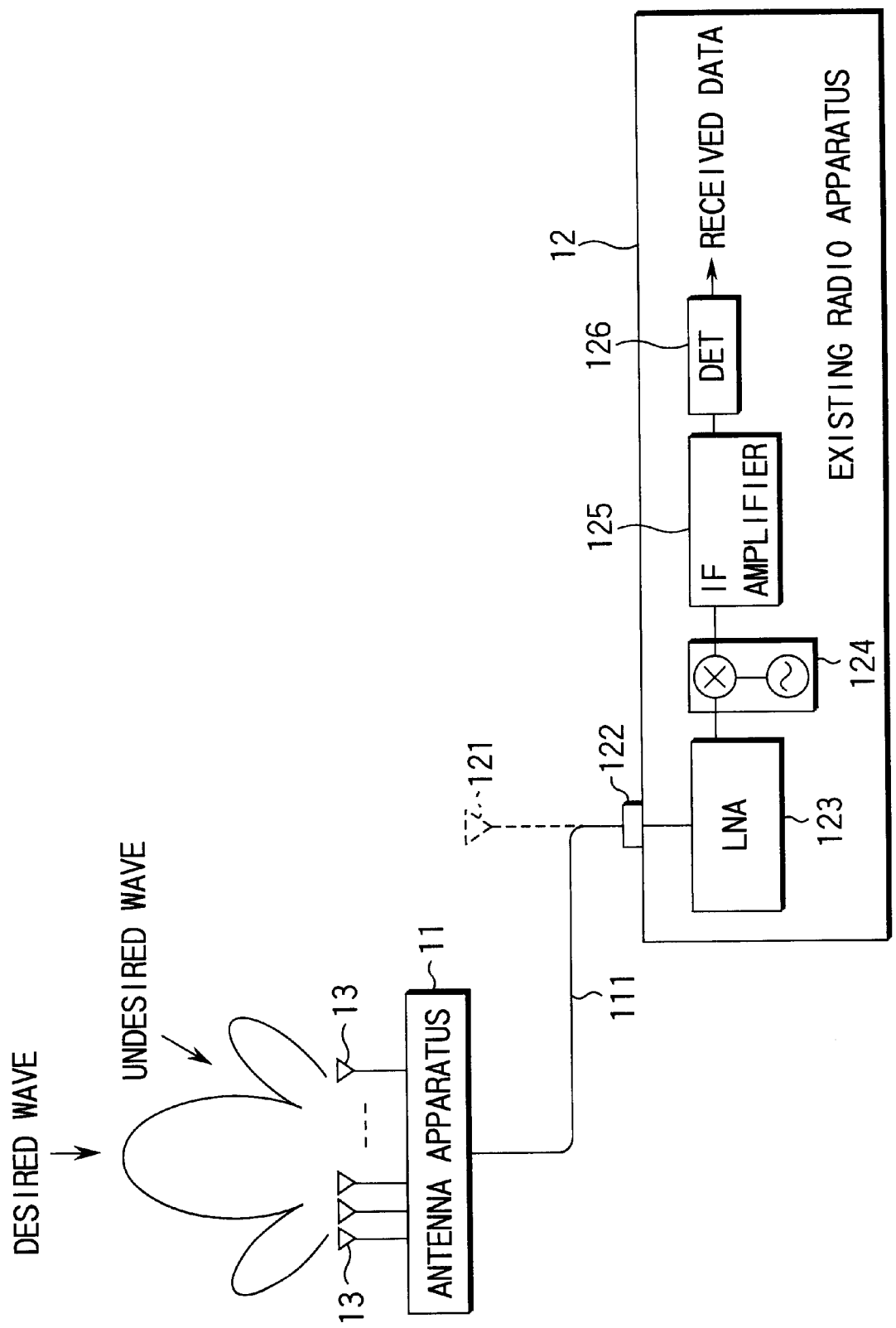
FIG. 1 is a schematic view illustrating an application of a directional antenna apparatus according to the present invention.

Embodiments of the present invention will be described in more detail referring to the drawings.

In an application of a directional antenna apparatus according to the present invention, as shown in FIG. 1, when a directional antenna apparatus 11 is connected to a radio apparatus 12 which has been provided in a base station or a terminal station, an antenna 121 of the radio apparatus 12 is removed from an antenna terminal 122, instead, is connected to.

Generally in the radio apparatus 12, a signal received at the antenna 121 is amplified by a low-noise amplifier (LNA) 123, frequency-converted by a frequency converter 124, amplified by an IF (intermediate frequency) amplifier 125, and detected by a detector (DET) 126 to demodulate a received data from a received signal.

When signals in a receiving frequency band of the radio apparatus 12 are received at each antenna element 13 of an adaptive array antenna, the directional antenna apparatus 11 down-converts a frequency of receiving signal, weights a phase and an amplitude to perform an optimum directional control, and then adds the signals to obtain a signal, and supplies the signal to an antenna terminal 122 of the radio apparatus 12 by converting a frequency of the signal up to the receiving frequency band of the radio apparatus 12. The directional antenna apparatus 11 sets a weighting coefficient for each antenna element 13, gives a strong directivity to a desired wave direction and a weak directivity to an unnecessary signal direction such as a multipath, thereby improving a reliability in a communication.

Although a receiving system is as described above, a transmitting system is as follows; the directional antenna apparatus 11 takes in a transmitting signal from the antenna terminal 122 of the radio apparatus 12, down-converting a frequency of the transmitting signal and in-phase divide a signal to each antenna element, and weights a phase and an amplitude to perform an optimum directional control for each signal, and then converts a frequency of each signal up to a transmitting frequency band of the radio apparatus 12 to transmit from each antenna element 13 as a transmitting signal.

(First Embodiment)

In this embodiment, an example of a directional antenna apparatus provided with only a receiver will be described.

Figure 2:
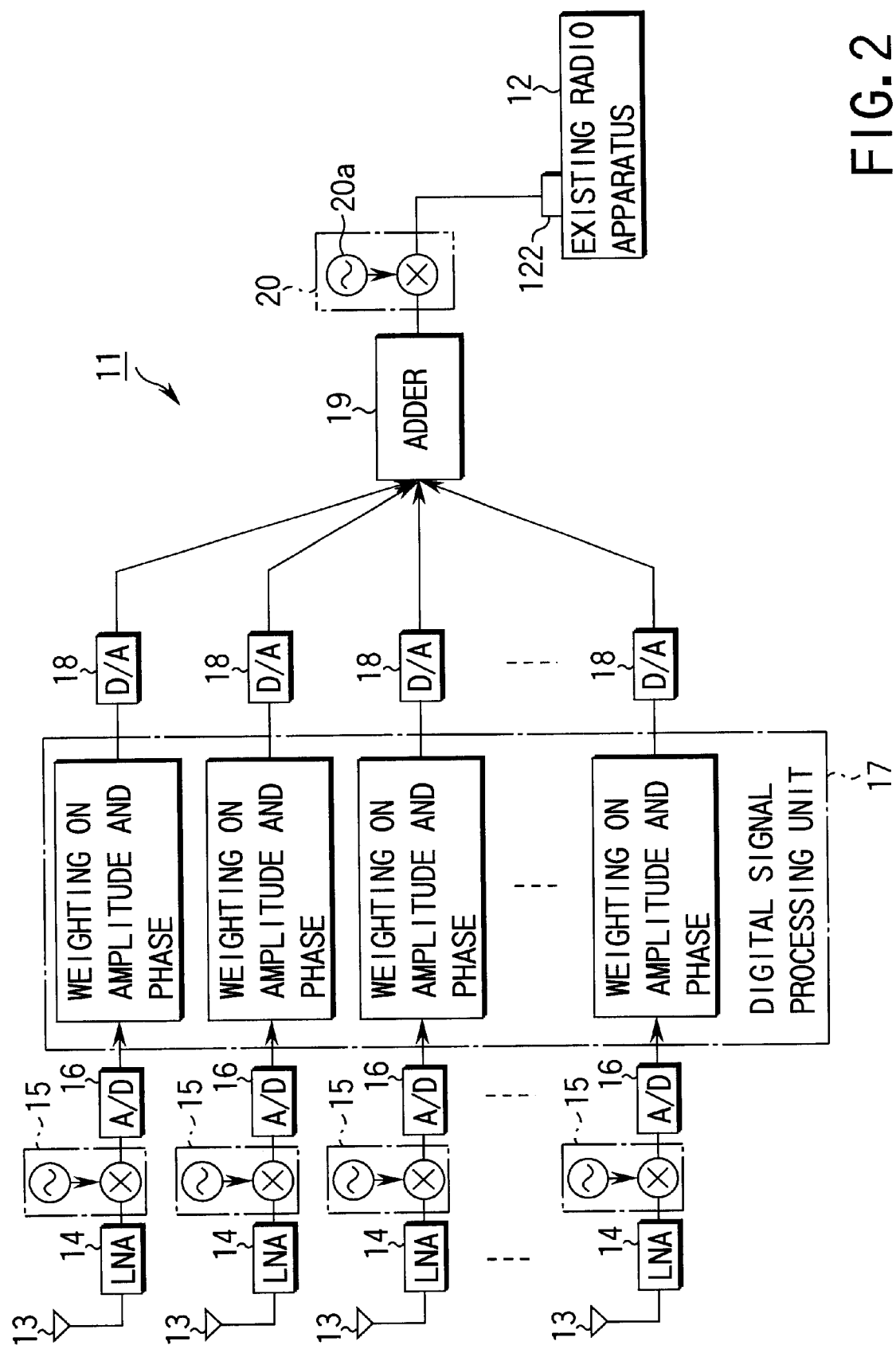
FIG. 2 is a block diagram showing a first embodiment of the present invention.

As shown in FIG. 2, in the directional antenna apparatus 11, signals in the receiving frequency band of the radio apparatus 12 are received at each antenna element 13 of the adaptive array antenna. Signal obtained by reception are amplified by a plurality of low-noise amplifiers (LAN) 14, respectively, and converted to low frequency signals by first receiving frequency converting means or a plurality of frequency converters 15. A received frequency is converted into a lower frequency by frequency-conversion through each frequency converter 15 because the lower the frequency, the more the sensitivity, selectivity and stability. Signal frequency-converted by the frequency converters 15 are converted to digital signals by a plurality of A/D converters 16 which is converting means to supply to a digital processing unit 17 as digital signal processing means.

The digital signal processing unit 17 comprises a one-chip microcomputer, a general-purpose CPU, or DSP excellent in the arithmetic function. The digital signal processing unit 17 weights on an amplitude and a phase of digital signals from the A/D converts 16 individually to optimally control the directivity, and supplies to a plurality of D/A converter 18 which are digital/analog (refer as D/A hereinafter) converting means.

The digital signal processing unit 17 performs arithmetic processing for each input digital signal to weight a phase and an amplitude by a weighting coefficient for a phase and an amplitude previously stored, a weighting coefficient determined by a digital signal processing with a comparison of a previous output signal and a current signal, and a weighting coefficient, etc., determined by a digital signal processing with a comparison of a previous output signal and a reference signal of a desired signal.

Each D/A converter 18 converts each weighted digital signal from the digital signal processing unit 17 to an analog signal, and supplies to an adder 19. The adder 19 adds analog signals to supply to second receiving frequency converting means or a frequency converter 20.

The frequency converter 20 converts a frequency of a signal input by a local oscillator 20a up to a frequency of an original signal received by the antenna element 13, that is, a receiving frequency band of the radio apparatus 12, and supplies to the antenna terminal 122 of the radio apparatus 12. Thus, the directional antenna apparatus 11 performs an optimum directional control and supplies the received signal to the antenna terminal 122 of the radio apparatus 12.

With this arrangement, when signals in a specific frequency band used in the radio apparatus 12 are received at a plurality of antenna elements 13, each received signal is converted into a lower frequency signal by the frequency converter 15, weighted on a phase and an amplitude by performing an arithmetic processing at the digital signal processing unit 17, and converted the weighted signal to an analog signal by the D/A converter 18, then adds. Then, the frequency of the analog signal is converted up to a frequency of the original received signal by the frequency converter 20, and supplied to the antenna terminal 122 of the radio apparatus 12.

In the radio apparatus 12, the signal received from the antenna terminal 122 is amplified by a low-noise amplifier (LAN) and converted to an IF band signal by a frequency converter. The IF signal is then amplified by an IF amplifier and detected by a detector to obtain received data of the signals.

As described above, the directional antenna apparatus 11 can easily be applied for the radio apparatus without improving the existing radio apparatus at all, only by connecting the directional antenna apparatus 11 to the antenna terminal 122 of the radio apparatus 12, instead of the antenna of the existing radio apparatus 12. Additionally, since weighting on the received signal is performed by a digital signal processing, stable weighting on an amplitude and a phase can be effected, thereby minimizing a size of the apparatus as compared with weighting by a analog signal processing.

(Second Embodiment)

Also in this embodiment, an example of a directional antenna apparatus provided with only a receiver will be described. While like components are denoted by like numerals as those of the first embodiment, only different parts will be illustrated.

Figure 3:
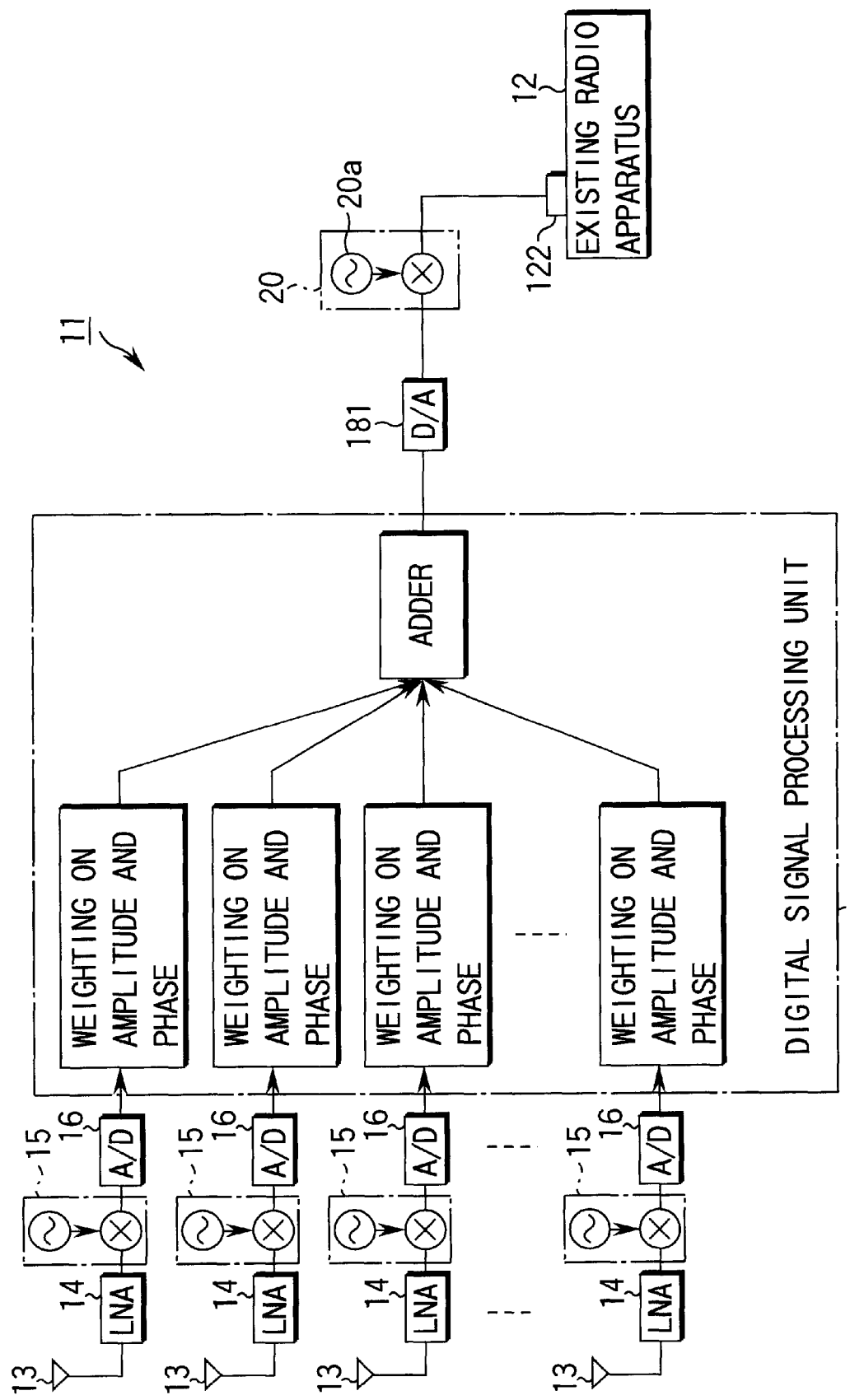
FIG. 3 is a block diagram showing a second embodiment of the present invention.

As shown in FIG. 3, a digital signal processing unit 171 is provided as digital processing means for adding signals after weighting a phase and an amplitude of each signal in order to optimally control the directivity for each received signal which has been digital-converted by the digital signal processing. Added digital signals from the digital signal processing unit 171 are converted to analog signals by the D/A converter 181, which are frequency-converted to frequencies of original signals by the frequency converter 20, and supplied to the antenna terminal 122 of the radio apparatus 12. Other configuration is the same as that of in the fist embodiment.

Even in such configuration, the same effects as that in the first embodiment can be obtained. Further, since adding processing is effected in the digital signal processing unit 171, the number of D/A converters to be used is reduced to one, and adder is not required, thereby further reducing a size of the apparatus.

(Third Embodiment)

Also in this embodiment, an example of a directional antenna apparatus provided with only a receiver will be described. While like components are denoted by like numerals as those of the previous embodiments, different parts will only be illustrated.

Figure 4:
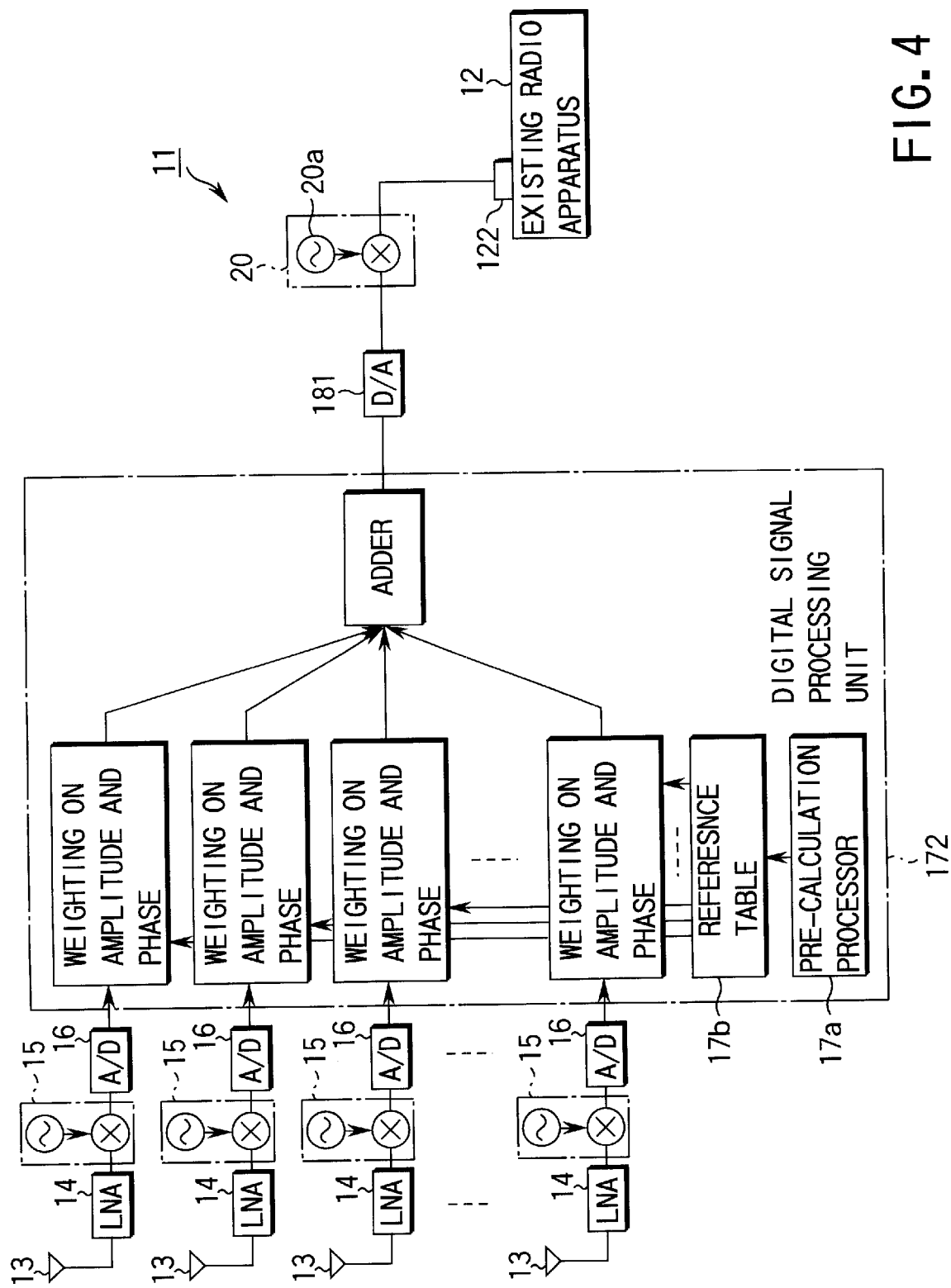
FIG. 4 is a block diagram showing a third embodiment of the present invention.

As shown in FIG. 4, a digital signal processing unit 172 is provided as digital processing means for adding signals after weighting coefficients for the amplitude and the phase are calculated from a combination of the desired wave direction and undesired wave directions in a pre-calculation processing unit 17a to store the coefficients in a reference table 17b, and signals are weighed on the amplitude and the phase with weighting coefficients for the amplitude and the phase of the reference table 17b in order to optimally control the directivity by the digital signal processing.

Added digital signal from the digital signal processing unit 172 are converted to analog signals by the D/A converter 181, which are frequency-converted to frequencies of the original received signals by the frequency converter 20 to be supplied to the antenna terminal 122 of the radio apparatus 12. The other arrangement is substantially identical to that of the second embodiment.

Also in this embodiment, the same effects as that in the first embodiment can be obtained. Moreover, similarly to the second embodiment, the digital signal processing unit 172 effects adding processing so that the number of D/A converters to be used can be reduced and an adder is not required, thereby further reducing a size of the apparatus.

The reference table 17b is provided for weighting processing on the amplitude and the phase with weighting coefficients for the amplitude and the phase of the reference table 17b so that a change of weighting coefficients set by rewriting the contents of the reference table can be easily conducted, thereby weighting processing suitable for the environment of the radio wave propagation only by changing a weighting coefficient in the reference table 17b according to a change of the environment of the radio wave propagation.

Although a case in which a reference table is provided in the digital signal processing unit for adding processing after weighting the amplitude and the phase of each signal has been described, this embodiment is not limited thereto. Further, a reference table can be provided in the digital signal processing unit for effecting only weighting on the amplitude and the phase of each signal as in the first embodiment.

(Fourth Embodiment)

In this embodiment, an example of a directional antenna apparatus provided with only a transmitter will be described.

Figure 5:
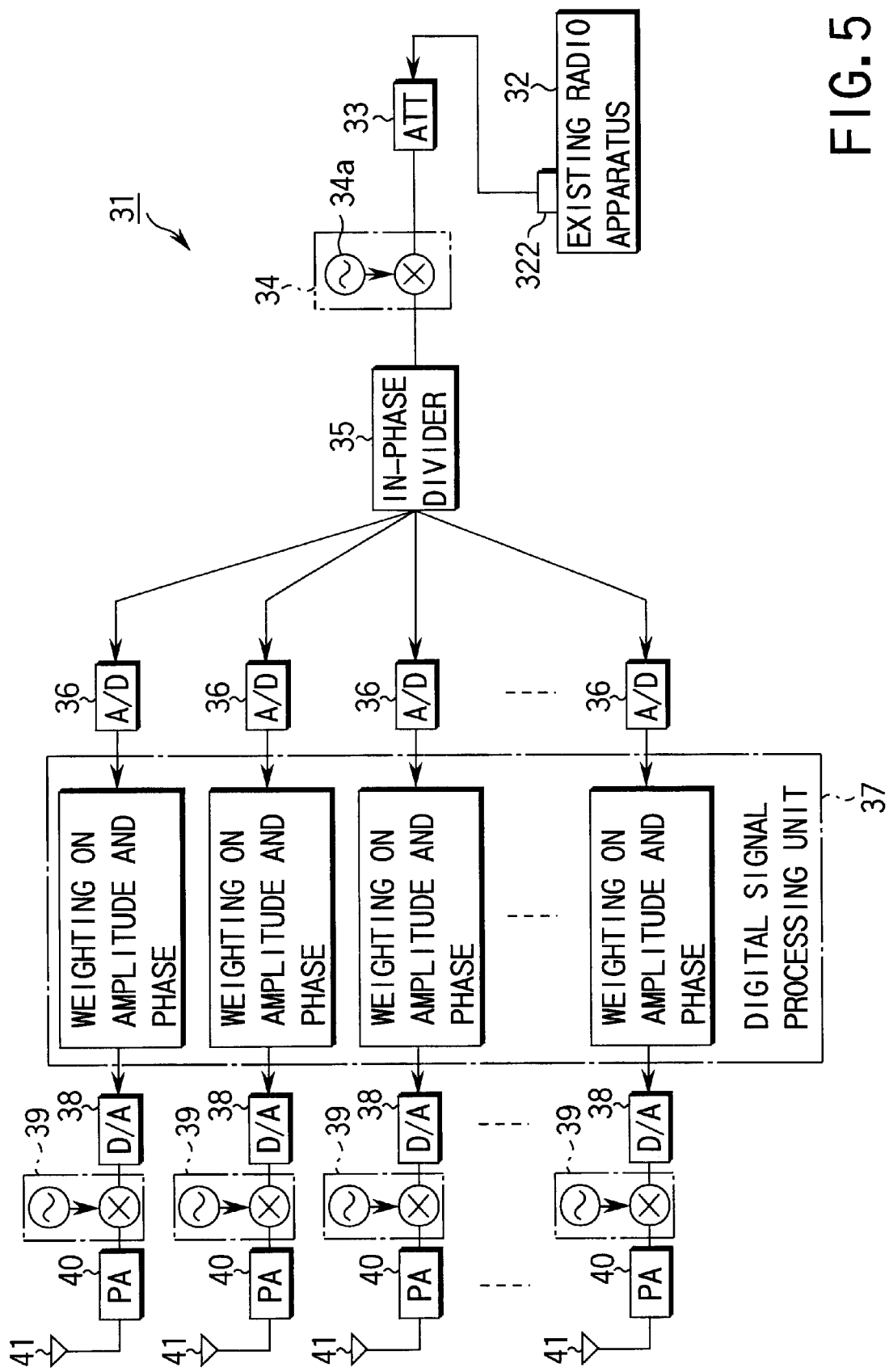
FIG. 5 is a block diagram showing a fourth embodiment of the present invention.

As shown in FIG. 5, a transmitting signal, which is obtained after transmitting data is modulated by a modulator, amplified by an IF amplifier, then converted to a RF band by a frequency converter in the radio apparatus 12, and amplified by a power amplifier (PA), is supplied to the directional antenna apparatus 31 from the antenna terminal 322.

The directional antenna apparatus 31 takes in the transmitting signal from the antenna terminal 322 of the radio apparatus 32 at a frequency converter 34, which is first transmitting frequency converting means, via an attenuator (ATT) 33. Using the local oscillator 34a, the frequency converter 34 converts the frequency of the transmitting signal input by the oscillator to a lower frequency which can be processed by an in-phase divider 35 and a plurality of A/D converters 36 which converts a plurality of signals in-phase divided by the in-phase divider 35 into the digital signals.

The signal frequency-converted by the frequency converter 34 is divided by the in-phase divider 35 into a plurality of in-phase divided signals, which are respectively converted into digital signals by the A/D converters 36, and supplied to the digital signal processing unit 37. The digital signal processing unit 37 comprises a one-chip microcomputer, a general CPU, or a DSP excellent in an arithmetic function. In the digital signal processing unit 37, the digital signals from the A/D converters 36 are weighted on the amplitude and the phase by the digital signal processing for optimally controlling the directivity, and supplied to D/A converting means or the D/A converters 38.

The digital signals are then converted to the analog signals form by the D/A converters 38 and supplied to second transmitting frequency converting means or a plurality of frequency converters 39. The frequency converters 39 convert input signals to signals in a transmitting frequency band of a radio apparatus 32. The frequency-converted signals are amplified by a plurality of power amplifiers (PA) 40 and then transmitted as transmitting signals from the antenna elements 41. Thus, the directional antenna apparatus 31 performs an optimum directional control and transmits signal.

In the arrangement, the transmitting signal from the antenna terminal 322 of the radio apparatus 32 is taken in via the attenuator 33 to the frequency converter 34, where the frequency is converted to a lower frequency, and supplied to the in-phase divider 35. The input signal is divided by the in-phase divider 35 to a plurality of in-phase divided signals, which are converted to digital signals by the A/D converters 36 to be supplied to the digital signal processing unit 37.

The digital signals are weighted on the amplitude and the phase by the digital signal processing unit 37. The weighted digital signals are then converted to analog signals by the D/A converters 38, and further converted to signals in a transmitting frequency band of the radio apparatus 32 by the frequency converters 39. The frequency-converted signals are amplified by the power amplifiers 40 and transmitted as the transmitting signals from the antenna elements 41.

As described above, the directional antenna apparatus 11 can easily be applied for the radio apparatus without improving the existing radio apparatus at all, only by connecting the directional antenna apparatus 11 to the antenna terminal 322 of the radio apparatus 12, instead of the antenna of the existing radio apparatus 12. Additionally, since weighting on the received signal is performed by a digital signal processing, stable weighting on an amplitude and a phase can be effected, thereby minimizing a size of the apparatus as compared with weighting by a analog signal processing.

(Fifth Embodiment)

This embodiment is also explained about an example of a directional antenna apparatus provided with only a transmitter. While like components are denoted by like numerals as those of the fourth embodiment, different parts will only be illustrated.

Figure 6:
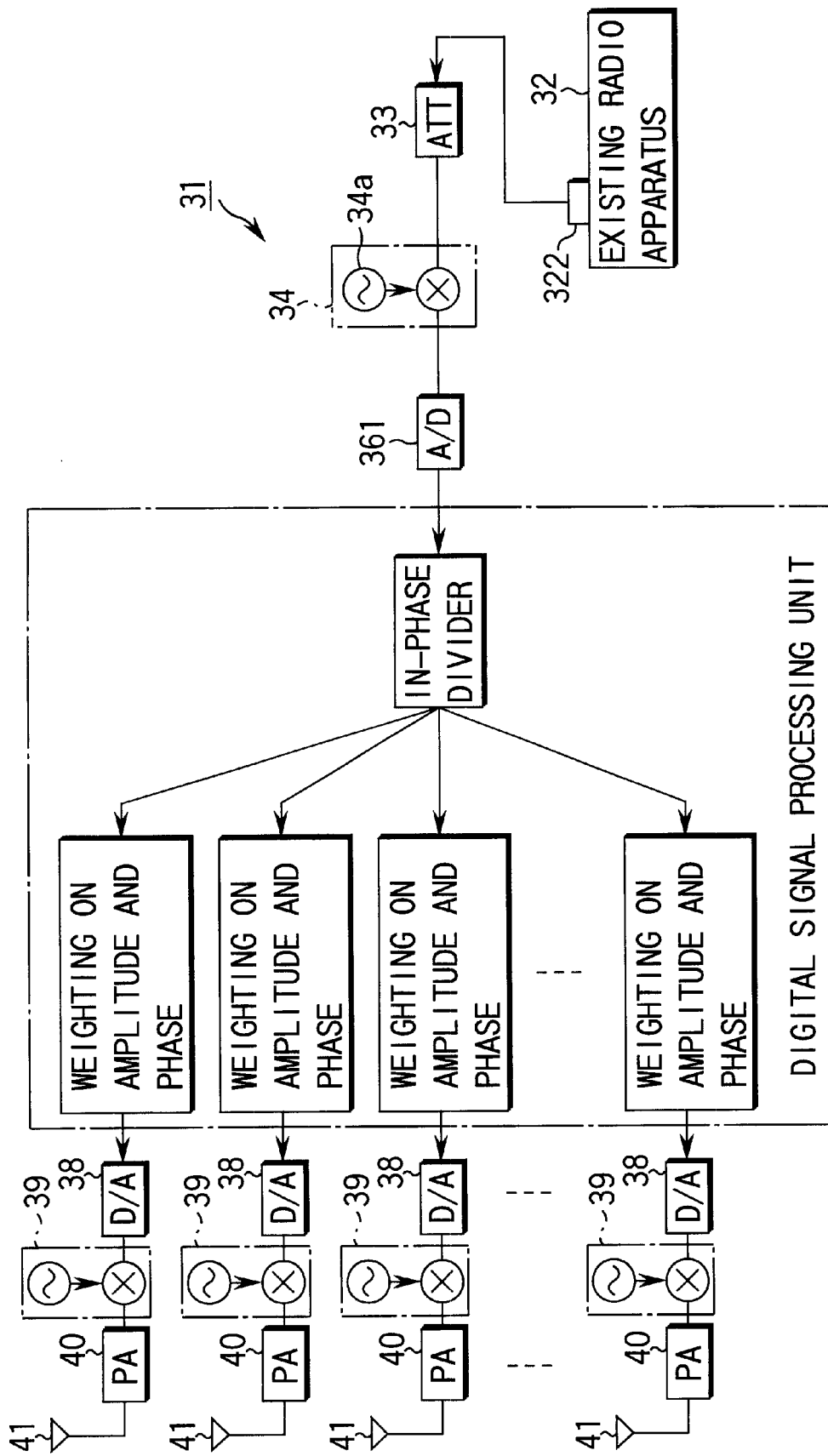
FIG. 6 is a block diagram showing a fifth embodiment of the present invention.

As shown in FIG. 6, a digital signal processing unit 371 is provided as the digital signal processing means for in-phase dividing a digital-converted signal by the digital signal processing and weighting the amplitude and the phase of each in-phase divided signal for optimally controlling the directivity for each in-phase divided signal. The transmitting signal from the radio apparatus 32 is taken into a frequency converter 34 via the attenuator 33, where the signal is converted to a lower frequency. The converting signal is further converted to the digital signal by an A/D converter 361 to be supplied to the digital signal processing unit 371.

In the digital signal processing unit 371, the digital signal is in-phase divided and each in-phase divided signal is weighted on the amplitude and the phase for optimally controlling the directivity. The weighted digital signals in the digital signal processing unit 371 are converted to analog signals by the D/A converters 38. The other arrangement is substantially identical to that of the fourth embodiment.

Accordingly, this embodiment can provide the same effect as of the fourth embodiment. Also, since the digital signal processing unit 371 performs the in-phase dividing processing, hence the number of the A/D converters can be reduced to one and no in-phase divider is required. Accordingly, the apparatus can further be minimized in the size.

(Sixth Embodiment)

This embodiment is also explained about an example of a directional antenna apparatus provided with only a transmitter. While like components are denoted by like numerals as those of each embodiment, different parts will only be illustrated.

Figure 7:
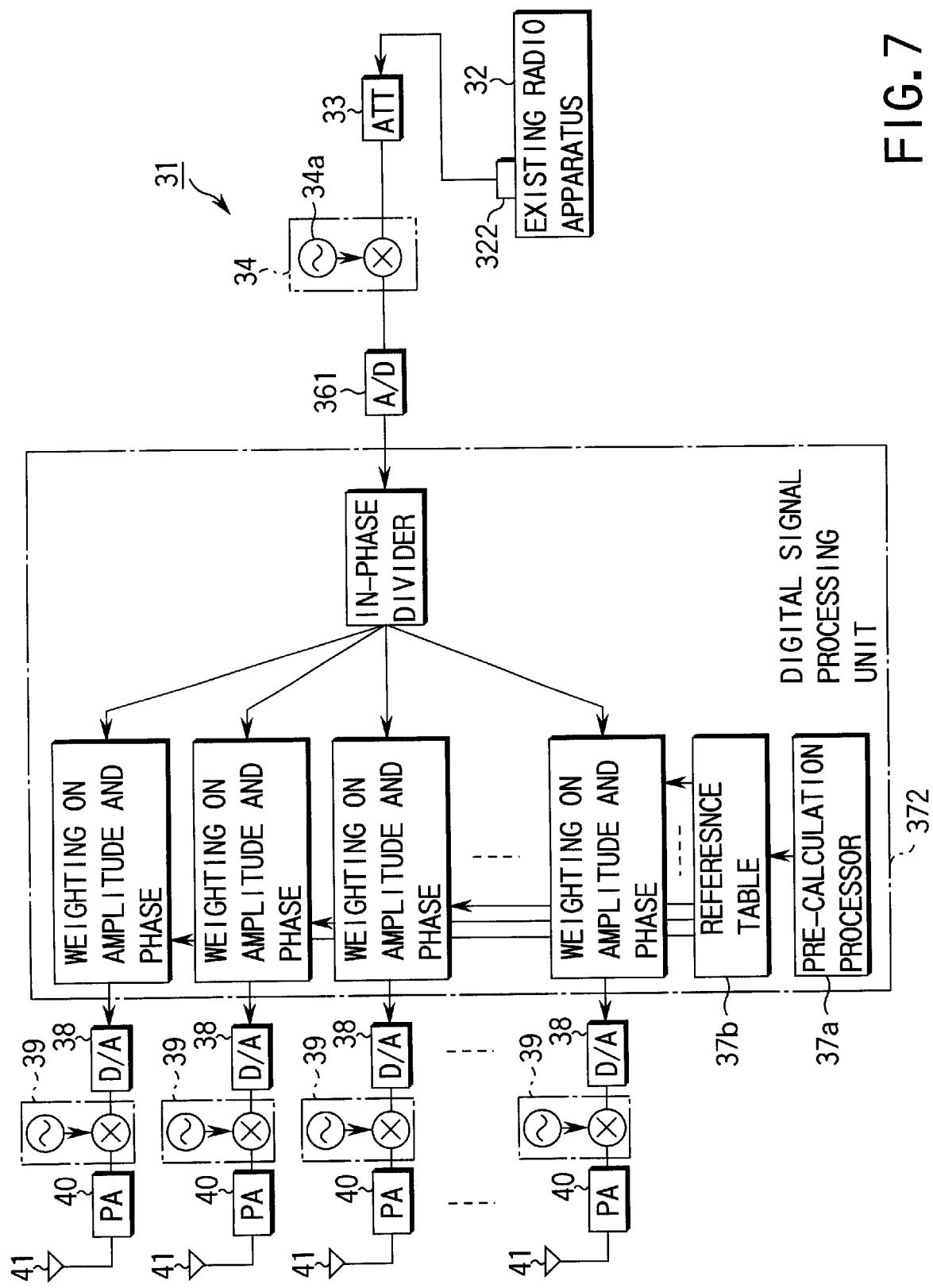
FIG. 7 is a block diagram showing a sixth embodiment of the present invention.

As shown in FIG. 7, a digital signal processing unit 372 is provided as digital processing means for calculating weighting coefficients for the amplitude and the phase from a combination of the desired wave direction and the undesired wave direction in a pre-calculation processing unit 37a to store the weighting coefficients in a reference table 37b, in-phase dividing a digital-converted transmitting signal by digital signal processing, and weighting the amplitude and the phase in accordance with the weighting coefficients stored in the reference table 37b for optimally controlling the directivity for each signal. The other arrangement is substantially identical to that of the fifth embodiment.

This embodiment can also provide the same effect as of the fourth embodiment. Moreover, since the digital signal processing unit 372 performs the in-phase dividing processing similarly to the fifth embodiment, the number of the D/A converters can be reduced to one and no in-phase divider is required. Accordingly, the apparatus can further be minimized in the size.

The reference table 37b is provided for weighting processing on the amplitude and the phase with weighting coefficients for the amplitude and the phase of the reference table 37b so that a change of weighting coefficients set by rewriting the contents of the reference table can be easily conducted, thereby weighting processing suitable for the environment of the radio wave propagation only by changing a weighting coefficient in the reference table 37b according to a change of the environment of the radio wave propagation.

Although a case in which a reference table is provided in the digital signal processing unit for in-phase dividing the transmitting signal and weighting the amplitude and the phase of the in-phase divided signals has been described, this embodiment is not limited thereto. The reference table may be provided in the digital signal processing unit for carrying out only the weighting on the amplitude and the phase of signals as in the fourth embodiment.

(Seventh Embodiment)

an example of a directional antenna apparatus equipped with both a receiver and a transmitter will be described in this embodiment.

Figure 8:
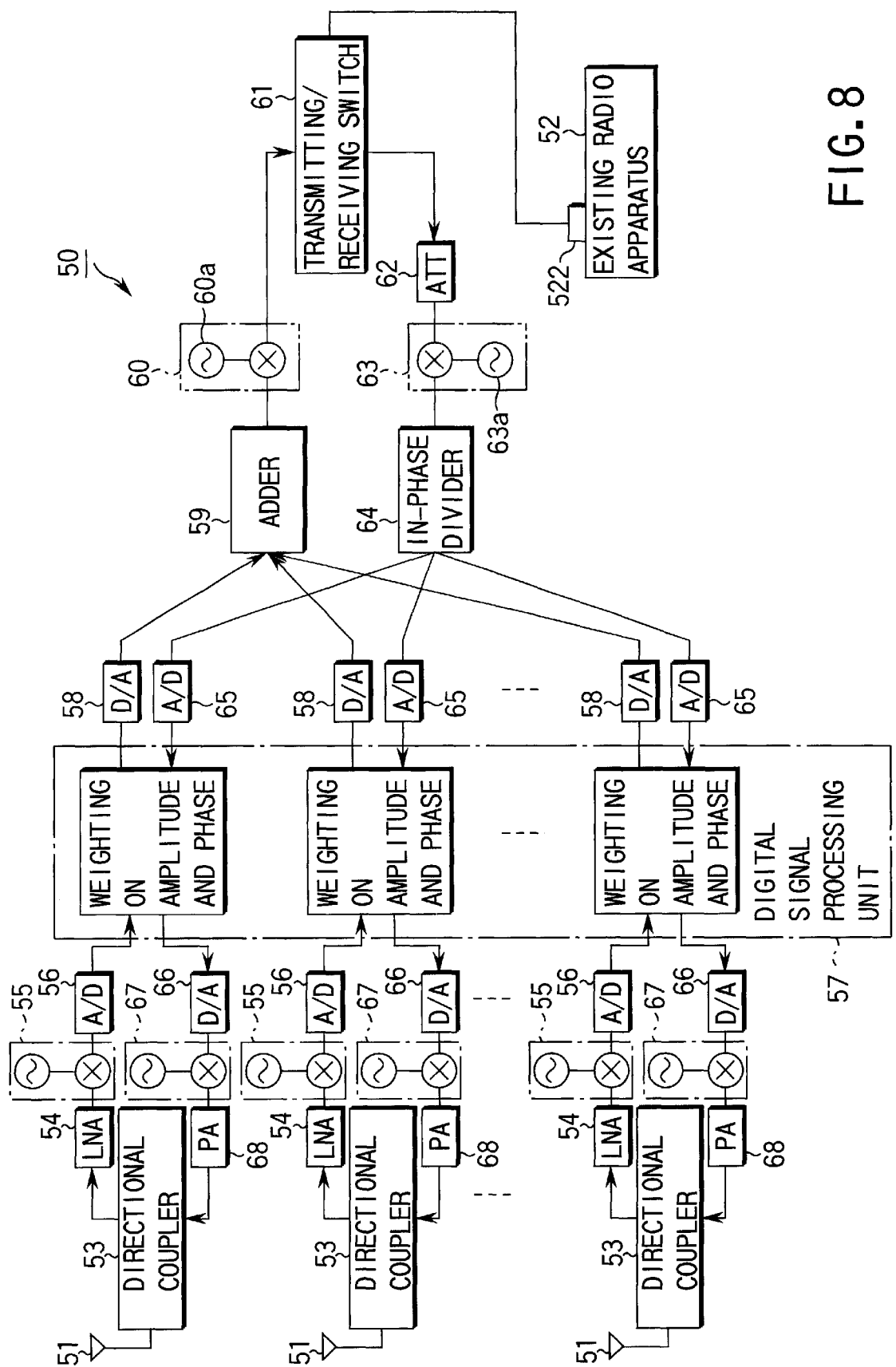
FIG. 8 is a block diagram showing a seventh embodiment of the present invention.

As shown in FIG. 8, an antenna terminal 522 for connecting antennas for both transmitting and receiving is provided as the radio apparatus 52. A receiver includes a low-noise amplifier (LNA), a frequency converter, an IF amplifier, and a detector to demodulate a received data from a received signal. A transmitter includes a modulator, a power amplifier (PA), a frequency converter, and an RF amplifier, and uses a transmitting/receiving radio apparatus for converting transmission data into a transmitting signal and transmitting the signal. Accordingly, the directional antenna apparatus 50 is connected to the antenna terminal 522 of the radio apparatus 52 instead of the antenna for both transmitting and receiving the signals.

A receiver section of the directional antenna apparatus 50 is designed for receiving signals in a receiving frequency band of the radio apparatus 52 at each antenna element 51 of the adaptive array antenna. The received signals are amplified by a plurality of low-noise amplifiers (LNA) 54 via directional coupler 53. The amplified signals are then converted to low frequency signals by first receiving frequency converting means or the frequency converters 55. The received signals are converted to lower frequency signals by the frequency converters 55 because the lower frequency signals are favorable in the sensitivity, the selectivity, and the stability.

The frequency-converted signals by the frequency converters 55 are converted into the digital signals by first A/D converting means or the A/D converters 56 and supplied to digital signal processing means or the digital signal processing unit 57.

The digital signal processing unit 57 comprises a one-chip microcomputer, a general-purpose CPU, or DSP excellent in the arithmetic function. In the digital signal processing unit 57, the digital signals from the A/D converters 56 are subjected to the digital signal processing to weight the amplitude and the phase by digital signal processing for optimally controlling the directivity. The weighted signals are supplied to first D/A converting means or the D/A converters 58.

The digital signal processing unit 57 carries out arithmetic processing for input digital signals to weight the amplitude and the phase in accordance with, for example, previously stored weighting coefficients for the amplitude and the phase, weighting coefficients determined by comparing the preceding output signal with the current signal, or weighting coefficients, etc., determined by comparing a preceding output signal with a reference signal of a desired signal.

The D/A converter 58 converts a digital signal from the digital signal processing, which weights a phase and an amplitude optimally to be controlled in the directivity, into an analog signal, and supplies to an adder 59. The adder 59 adds signals from the respective D/A converters 58, and supplies to supply second receiving frequency converting means or a frequency converter 60. The frequency converter 60 converts the frequency of the signal input by a local oscillator up to a frequency of the original signal received by the antenna element 51, that is, a receiving frequency band of the radio apparatus 52. The frequency is supplied via transmission/reception switching means or the transmission/reception switch 61 to the antenna terminal 522 of the radio apparatus 52. Thus, the directional antenna apparatus 51 performs an optimum directional control and supplies the received signal to the antenna terminal 522 of the radio apparatus 52.

In the radio apparatus 52, the received signal from the directional antenna apparatus 50 is amplified by a low-noise amplifier (LNA) and converted to an IF band by a frequency converter. The signal is then amplified by an IF amplifier and detected by a detector to obtain transmitting data of the signals.

A transmitter section of the directional antenna apparatus 50 is designed for taking in a transmitting signal from the antenna terminal 522 of the radio apparatus 52 via the transmission/reception switch 61 and an attenuator 62 to first transmitting frequency converting means or the frequency converter 63. The frequency converter 63 converts the frequency of the transmitting signal to a lower frequency signal applicable to an in-phase divider 64 and second A/D converting means or a plurality of A/D converters 65.

The frequency-converted signal by the frequency converter 63 is then in-phase divided for the antenna element 51 by the in-phase divider 64, which is converted to a digital signal by the A/D converter 65, and supplied to the digital signal processing unit 57. In the digital signal processing unit 57, the digital signals are weighted on the amplitude and the phase for optimally controlling the directivity, and supplied to second D/A converting means or the D/A converters 66.

The D/A converter 66 converts the digital signal to the analog signal, and supplies to second transmitting frequency converting means or the frequency converter 67. The frequency converter 67 converts the frequency of the analog signal to a signal in a transmitting frequency band of the radio apparatus 52. The frequency-converted signal is then amplified by a power amplifier 68 and transmitted via the directional coupler 53 from the antenna element 51. Thus, the directional antenna apparatus 50 performs an optimum directional control and transmits signal.

In the arrangement, when signals in a transmitting frequency band of the radio apparatus 52 are received at the antenna elements 51, the received signal are converted to lower frequency signals by the frequency converters 55, further converted into the digital signal by the A/D converters 56, and processed by the digital signal processing unit 57 to weight the amplitude and the phase. The digital signals, which weights a phase and an amplitude optimally to be controlled in the directivity are converted to the analog signals by the D/A converters 58, added by an adder 59, converted by the frequency converter 60 up to a frequency in a receiving frequency band of the radio apparatus 52, and supplied via the transmission/ reception switch 61 to the antenna terminal 522 of the radio apparatus 52.

In the radio apparatus 52, the signals from the directional antenna apparatus 50 are amplified by a low-noise amplifier (LNA), converted to an IF band signal by a frequency converter, amplified by an IF amplifier, and detected by a detector to obtain a received data of the signals.

For transmission of transmitting data, in the radio apparatus 52, a transmitting signal output after a signal is modulated by a modulator, amplified by an IF amplifier, frequency converted by a frequency converter, and further amplified by an RF amplifier is taken in via the antenna terminal 522 of the radio apparatus, the transmission/reception switch 61 and the attenuator 62 to the frequency converter 63, where the signal is converted to a lower frequency signal. The frequency-converted signal is then in-phase divided by the in-phase divider 64 for the antenna elements 51. The in-phase divided signal is converted to the digital signal by the A/D converter 65 and supplied to the digital signal processing unit 57.

In the digital signal processing unit 57, the digital signals are weighted on the amplitude and the phase. The digital signals weighted in the digital signal processing unit 57 are then converted to the analog signal by the D/A converters 66 and changed by the frequency converters 67 to signals in a transmitting frequency band of the radio apparatus 52. The frequency-converted signals are amplified by the power amplifiers 68 and transmitted as the transmitting signal via the directional coupler 53 from the antenna elements 51.

As described above, the directional antenna apparatus can easily be applied for the radio apparatus without improving the existing radio apparatus at all, only by connecting the directional antenna apparatus 50 to the antenna terminal 522 of the radio apparatus 12, instead of the antenna of the existing radio apparatus 12. Additionally, since weightings on the received signal and transmitting signal are performed by a digital signal processing, stable weighting on an amplitude and a phase can be effected, thereby minimizing a size of the apparatus as compared with weighting by a analog signal processing.

(Eighth Embodiment)

This embodiment is also described about an example of a directional antenna apparatus equipped with both a receiver and a transmitter. While like components are denoted by like numerals as those of the seventh embodiment, different parts will only be illustrated.

Figure 9:
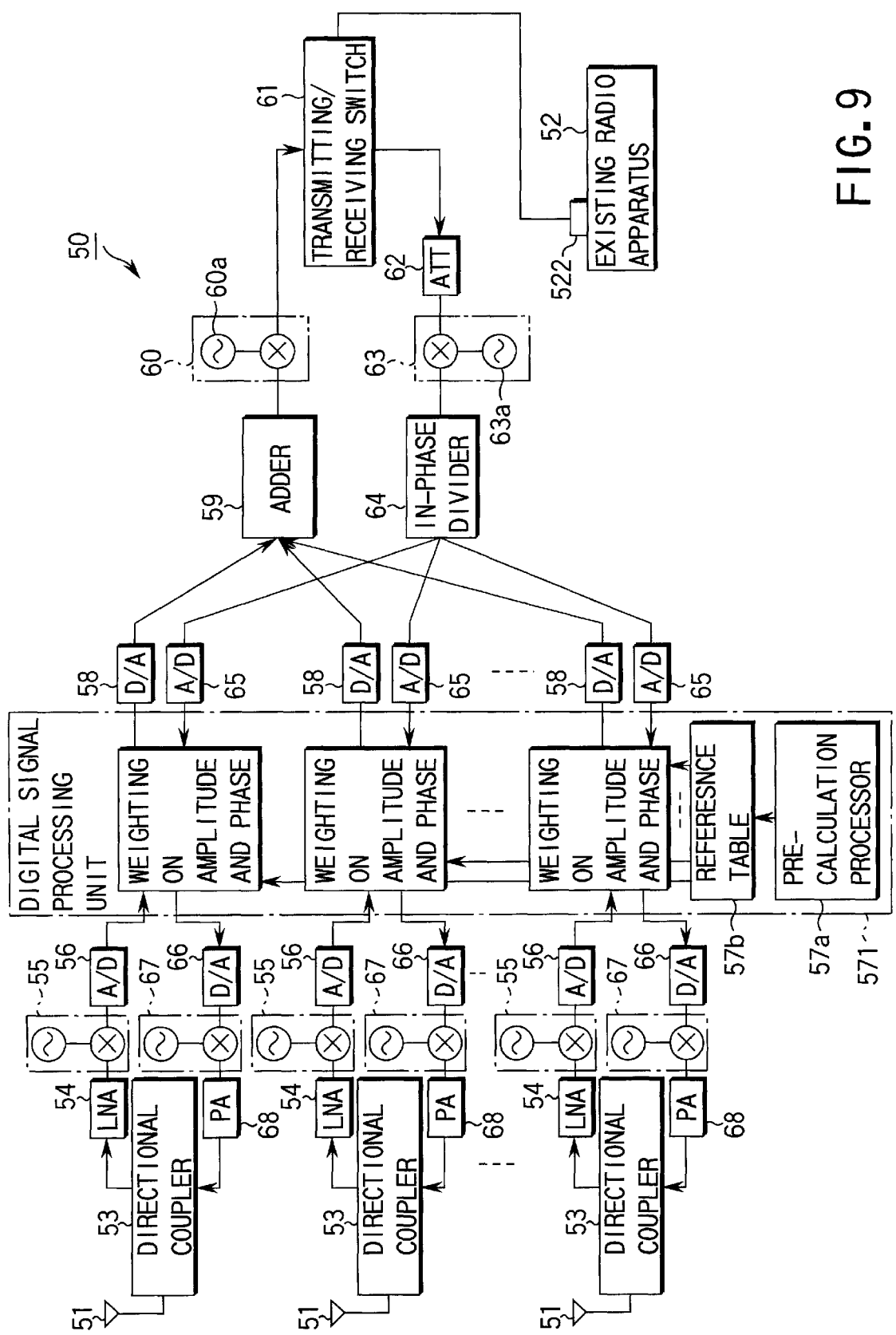
FIG. 9 is a block diagram showing an eighth embodiment of the present invention.

As shown in FIG. 9, a digital signal processing unit 571 is provided as the digital signal processing means for calculating weighting coefficients for the amplitude and the phase from a combination of the desired wave direction and the undesired wave direction in a pre-calculation processing unit 57a to store the weighting coefficients in a reference table 57b, when reception, weighting the amplitude and the phase for signals digital-converted by the A/D converters 56 in accordance with the weighting coefficients stored in the reference table 57b for optimally controlling the directivity, and when transmission, weighting the amplitude and the phase of signals digital-converted by a plurality of A/D converters 65 in accordance with the weighting coefficients stored in the reference table 57b for optimally controlling the directivity. The other arrangement is substantially identical to that of the seventh embodiment.

This embodiment can also provide the same effect as of the seventh embodiment.

The reference table 57b is provided for weighting processing on the amplitude and the phase with weighting coefficients for the amplitude and the phase of the reference table 57b so that a change of weighting coefficients set by rewriting the contents of the reference table can be easily conducted, thereby weighting processing suitable for the environment of the radio wave propagation only by changing a weighting coefficient in the reference table 57b according to a change of the environment of the radio wave propagation.

(Ninth Embodiment)

This embodiment is also described about an example of a directional antenna apparatus equipped with both a receiver and a transmitter. While like components are denoted by like numerals as those of the eighth embodiment, different parts will only be illustrated.

Figure 10:
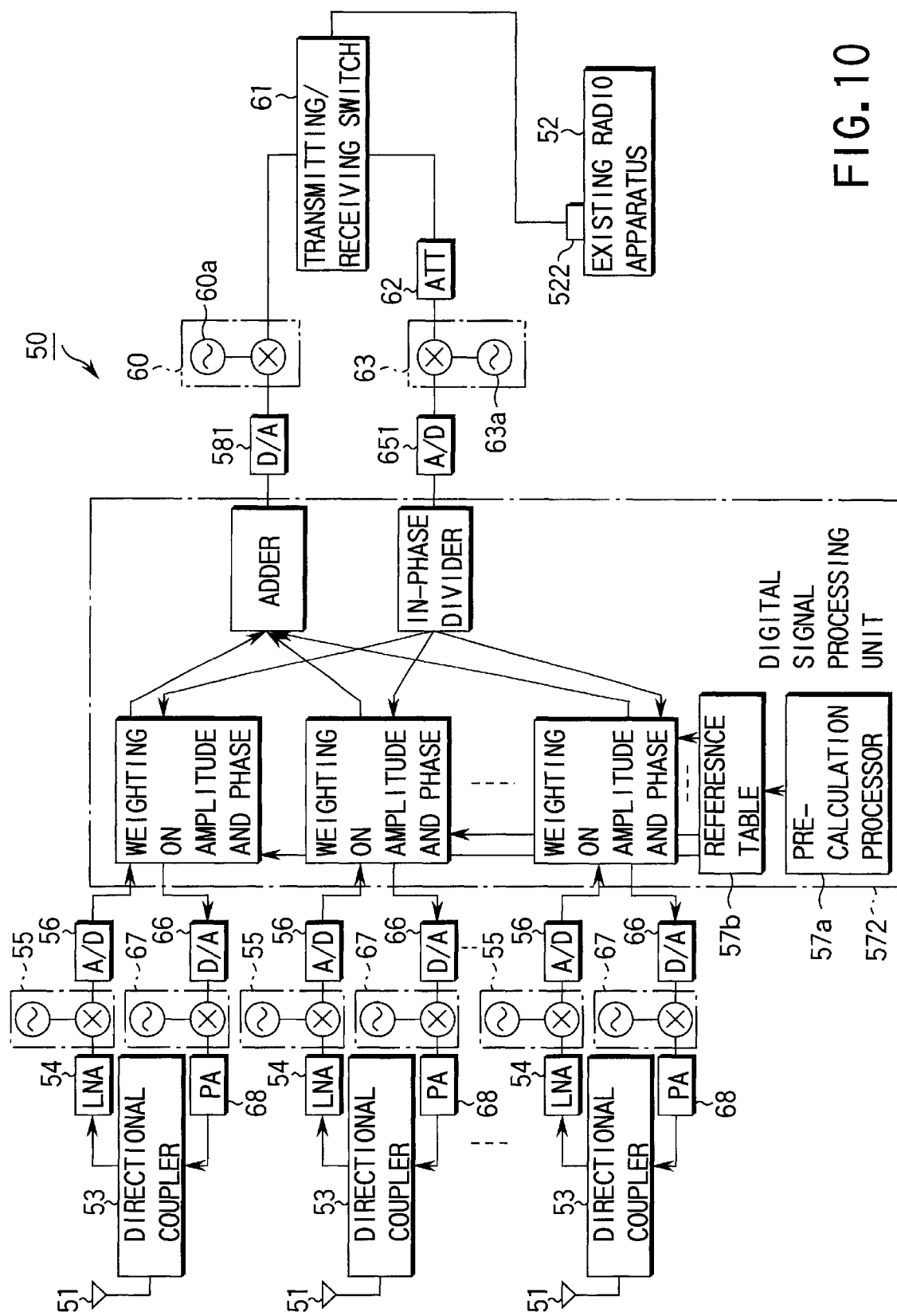
FIG. 10 is a block diagram showing a ninth embodiment of the present invention.

As shown in FIG. 10, a digital signal processing unit 572 is provided as the digital signal processing means for calculating weighting coefficients for the amplitude and the phase from a combination of the desired wave direction and the undesired wave direction in a pre-calculation processing unit 57a to store the weighting coefficients in a reference table 57b, when reception, weighting the amplitude and the phase for signals digital-converted by a plurality of A/D converters 56 in accordance with the weighting coefficients stored in the reference table 57b for optimally controlling the directivity, adding the weighted signals, and outputting to a D/A converter 581, when transmission, in-phase dividing a signal digital-converted by an A/D converters 651, weighting the amplitude and the phase of in-phase divided signals in accordance with the weighting coefficients stored in the reference table 57b for optimally controlling the directivity, and outputting to the D/A converters 66. The other arrangement is substantially identical to that of the eighth embodiment.

Figure 11:
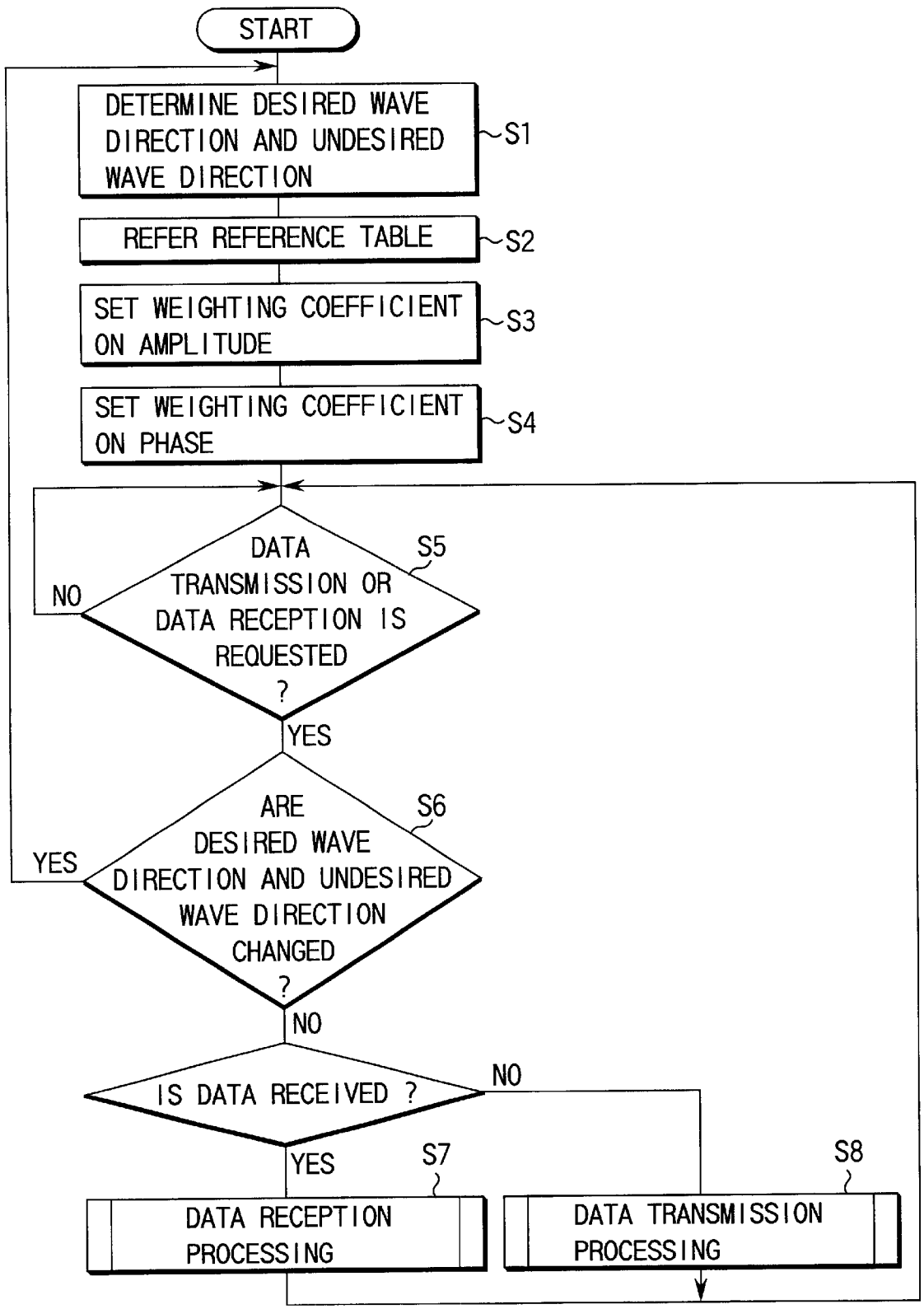
FIG. 11 is a flowchart showing a processing of a digital signal processing unit in the embodiment.

The processing of the digital signal processing unit 572 will be explained in more detail. Referring to FIG. 11, in step S1, the desired wave direction and undesired wave direction are determined. Step S2 follows for referencing the weighting coefficients for the amplitude and the phase determined from a combination of the desired wave direction and the undesired wave direction by the pre-calculation processing unit 57a and stored in the reference table 57b. Then, the weighting coefficient for the amplitude is determined at Step S3 and the weighting coefficient for the phase is determined at Step S4. The procedure goes to Step S5 and waits until data transmission or data reception is demanded.

When the data transmission or data reception is requested, the desired wave direction and the undesired wave direction are confirmed at Step S6. When the direction is changed, the processings at Steps S1 to S4 are repeated to refer and determine a new weighting coefficient for the amplitude and the phase from the reference table 57b. If not, the data transmission or data reception is started. When the data reception is desired, the procedure goes to Step S7 for performing the data reception. When the data transmission is desired, data transmitting processing is executed at Step S8.

Figure 12:
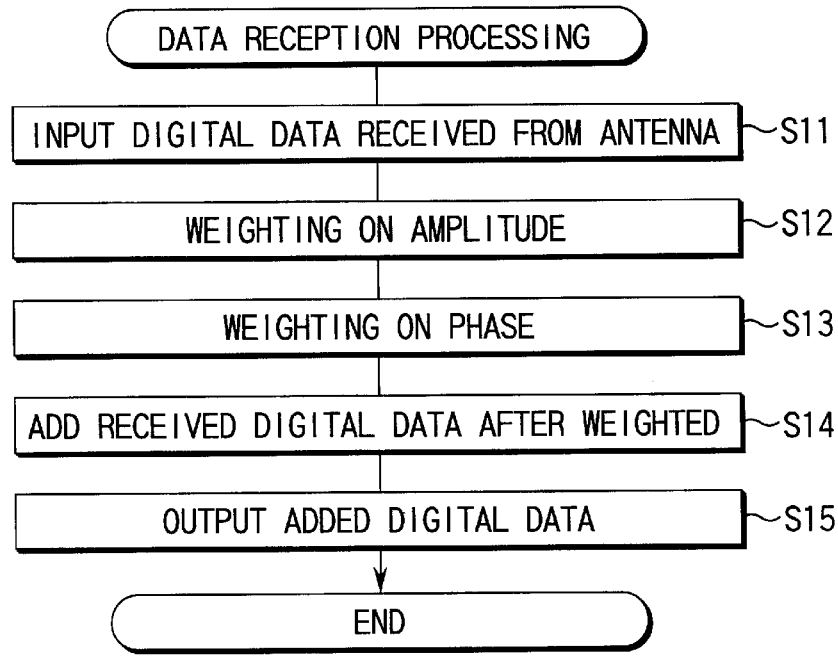
FIG. 12 is a flowchart specifically showing a data receiving processing shown in FIG. 11.

The data reception is conducted as follows; as shown in FIG. 12, in Step S11, received signals received by the antenna elements 51 are input as digital signals from the A/D converters 56. Then, the weighting of the amplitude and the phase is carried out at Steps S12 and S13 in according with the weighting coefficients in the reference table 57b. Step S14 follows, where the weighted digital signals are added, and outputted the obtained digital signal to the D/A converter 581.

Figure 13:
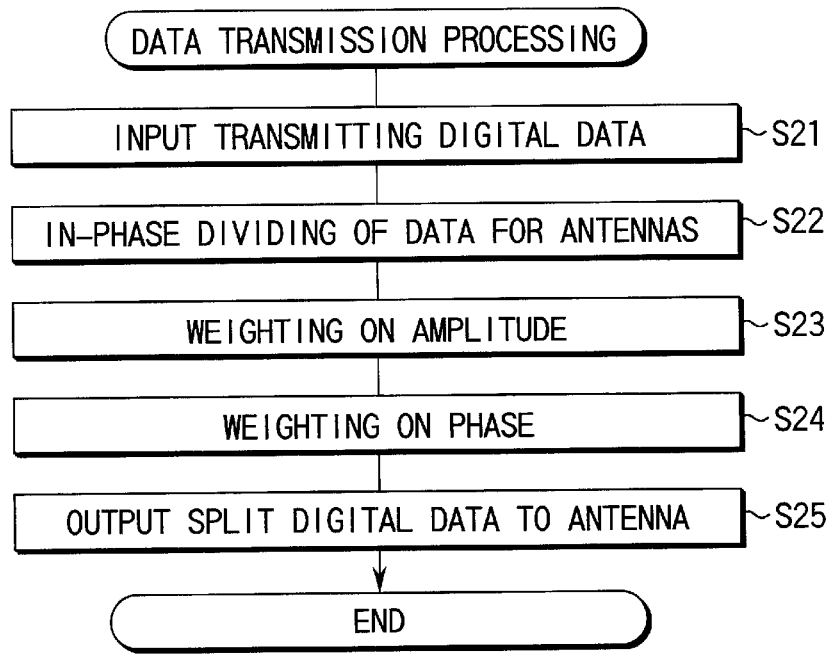
FIG. 13 is a flowchart showing explicitly a procedure of data transmitting process shown in FIG. 11.

Referring to FIG. 13, in step S2, the data transmission means inputs a digital signal of the signal from the A/D converter 651. Step S22 follows where the input digital signals are in-phase divided for the antenna elements 51. Then, the in-phase divided digital signals are weighted on the amplitude and the phase at Steps S23 and S24 using the weighting coefficients in the reference table 57b. At Step S25, the obtained digital signals are output to the D/A converters 66.

Also in this embodiment, the same effect as of the seventh embodiment can be obtained. Similar to the eighth embodiment, a change of weighting coefficients set by rewriting the contents of the reference table can be easily conducted, thereby weighting processing suitable for the environment of the radio wave propagation only by changing a weighting coefficient in the reference table 17b according to a change of the environment of the radio wave propagation.

Further, since the digital signal processing unit 572 carries out the adding processing and the in-phase dividing processing, the number of the first D/A converting means or the D/A converters and the number of the second A/D converting means or the A/D converters can be reduced to one, respectively. Simultaneously, no adder or in-phase divider is needed and the apparatus will further be minimized in the overall size.

Figure 14:
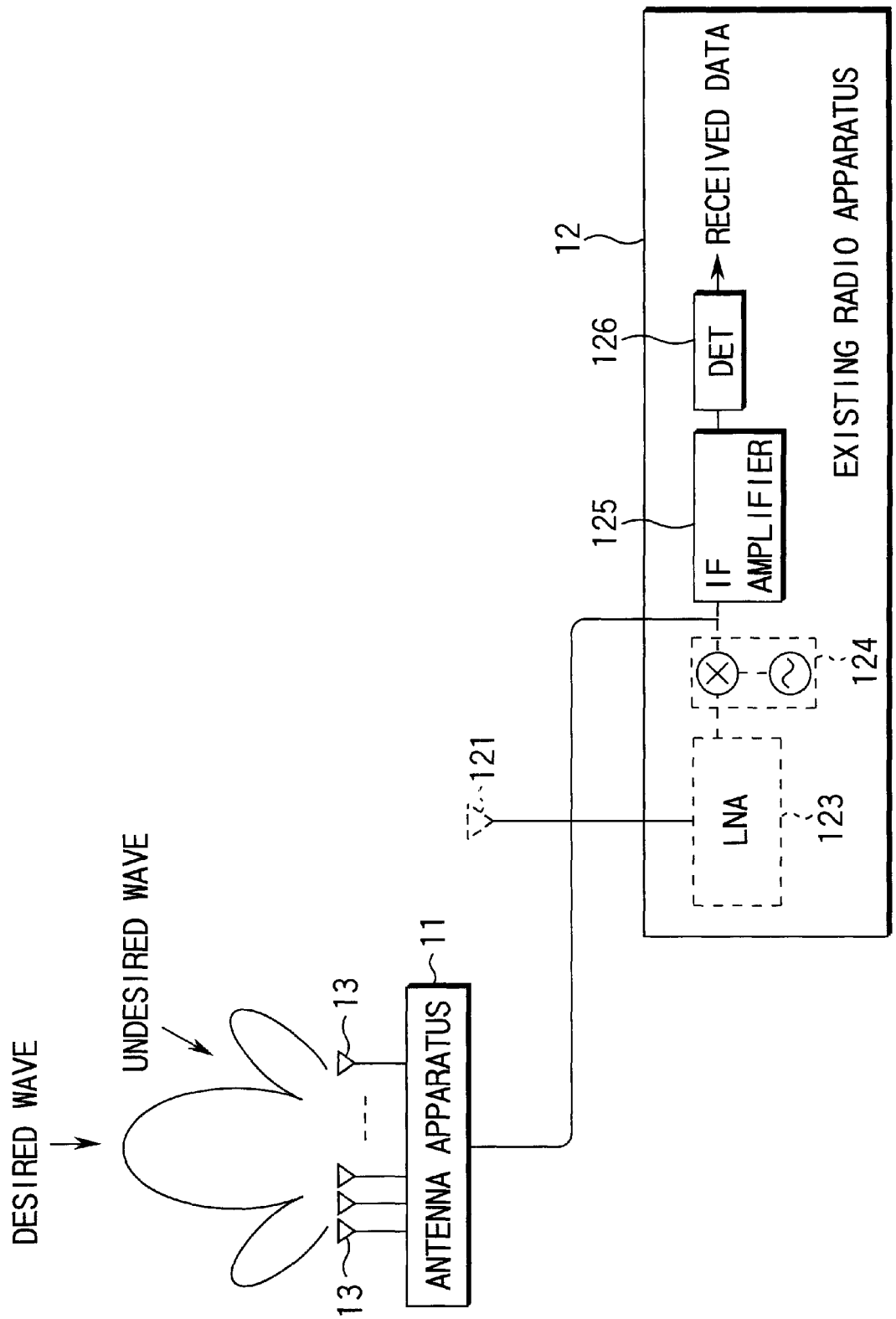
FIG. 14 is a schematic view illustrating an application of the directional antenna apparatus of the present invention.

Another application of the directional antenna apparatus of the present invention will now be explained. Referring to FIG. 14, when the directional antenna apparatus 11 is connected to the radio apparatus 12 installed in a base station or a terminal station, the antenna 121 of the radio apparatus 12 has been removed, the directional antenna apparatus 11 is connected to, an optional point in a receiver e.g., an input terminal of an IF (intermediate frequency) amplifier 125 in a receiver of the radio apparatus 12. Originally in the radio apparatus 12, a signal received by the antenna 121 is amplified by a low-noise amplifier (LNA) 123, frequency-converted by the frequency converter 124, amplified again by the IF amplifier 125, and detected by a detector 126 to obtain received data of the signal.

In the directional antenna apparatus 11, when signals in a receiving frequency band of the radio apparatus 12 are received by the antenna elements 13 of an adaptive array antenna, the directional antenna down-converts a frequency of each receiving signal, weights a phase and an amplitude to perform an optimum directional control, adds the signals to obtain a signal, and then converts a frequency to the IF band of the radio apparatus 12, and supplies the signal to an input terminal of the IF amplifier 125. The directional antenna apparatus 11 determines the weighting coefficients to the antenna elements 13 respectively for giving a strong directivity in the desired wave direction while a lower directivity in the other undesired wave direction such as multipath, hence improving the reliability of communication.

The directional antenna apparatus 11 may be connected to an input terminal of the frequency converter 124 in the receiver's RF (radio frequency) of the radio apparatus 12. In that case, the directional antenna apparatus 11 sets the frequency to a signal to the RF band which is supplied from the low-noise amplifier (LNA) 123 of the RF section to the frequency converter 124 in the radio apparatus 12.

In the transmission mode, as compared with the reception mode described above, the signal of the RF band is taken in from the radio apparatus 12, and down-converted in the frequency, in-phase divided for the antenna elements, and weights a phase and amplitude to perform an optimum directional control. Then, the frequency of the signal is converted to a signal in a transmitting frequency band of the radio apparatus 12 and transmitted as the transmitting signal from the antennas 13.

(Tenth Embodiment)

This embodiment is illustrated about an example of a directional antenna apparatus equipped with only a receiver.

Figure 15:
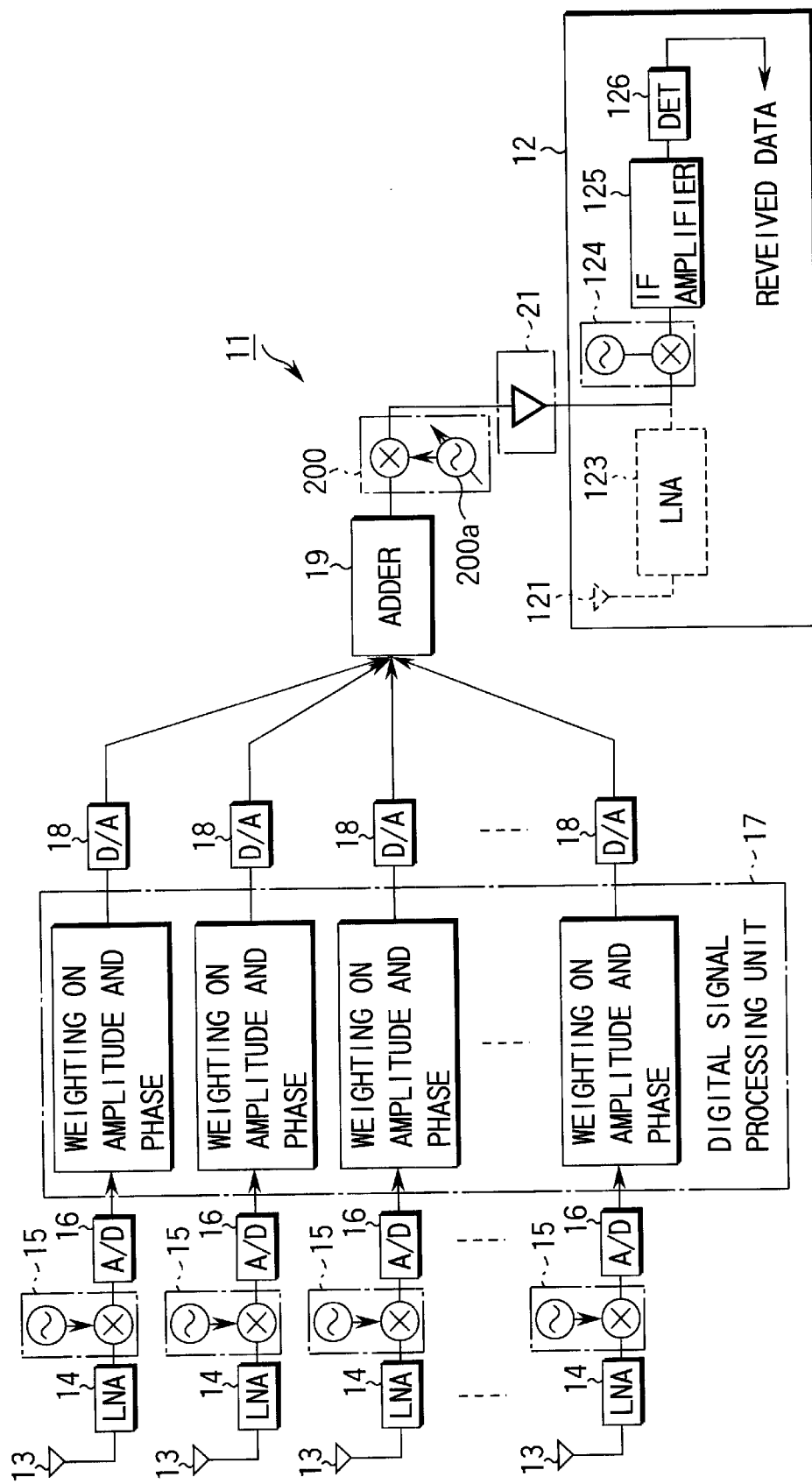
FIG. 15 is a block diagram showing a tenth embodiment of the present invention.

As shown FIG. 15, the directional antenna apparatus 11 is designed for receiving signals in a receiving frequency band of the radio apparatus 12 at the antenna elements 13 of an adaptive array antenna. The received signals are amplified by the low-noise amplifiers (LNA) 14 and converted to signals of a lower frequency band by the first frequency converting means or the frequency converters 15. The received signals are converted to lower frequency signals by the frequency converters 15 because the lower frequency signals are favorable in the sensitivity, the selectivity,, and the stability. The frequency-converted signals by the frequency converters 15 are converted into digital signals by the A/D converting means or the A/D converters 16, and supplied to digital signal processing means or the digital signal processing unit 17.

The digital signal processing unit 17 comprises an one-chip microcomputer, a general-purpose CPU, DSP excellent in the arithmetic function, caries out digital signal processing to weight the amplitude and the phase for the digital signals from the A/D converters 16 for optimally controlling the directivity, and is supplied to D/A converting means or the D/A converters 18 respectively.

The digital signal processing unit 17 performs arithmetic processing for each input digital signal to weight a phase and an amplitude by a weighting coefficient for a phase and an amplitude previously stored, a weighting coefficient determined by a digital signal processing with a comparison of a previous output signal and a current signal, and a weighting coefficient, etc., determined by a digital signal processing with a comparison of a previous output signal and a reference signal of a desired signal.

The weighted digital signals from the digital signal processing unit 17 are then converted to the analog signals by the D/A converters 18 and supplied to an adder 19. The adder 19 adds the analog signals and supplies a sum to second receiving frequency converting means or a frequency converter 200.

The frequency converter 200 has a local oscillator 200a capable of variably setting a frequency. A frequency of the signal input by setting the frequency of the local oscillator 200a is converted up to an RF band of the radio apparatus 12, and is supplied to an input terminal of the RF section's the frequency converter 124 of the radio apparatus 12 via the interface unit 21 comprising a buffer for matching with the radio apparatus 12. Thus, the directional antenna apparatus 11 performs an optimum directional control and supplies the received signal to the input terminal of the RF section's converter 124 in the radio apparatus 12.

In such an arrangement, signals in a receiving frequency band of the radio apparatus 12 are received by the antenna elements 13, converted into lower frequency signals by the frequency converters 15, converted to digital signals by the A/D converters 16, and weighted on the amplitude and the phase by the digital signal processing unit 17, the weighted digital signals are converted to the analog signals by the D/A converters 18, and added. The analog signal is then increased to the RF band by the frequency converter 200 and supplied via the I/F unit 21 to the input terminal of the RF section's frequency converter 124 in the radio apparatus 12.

In the radio apparatus 12, the signal from the directional antenna apparatus 11 is converted to an IF band signal by the frequency converter 124, amplified by an IF amplifier 125, and detected by the detector 126 to obtain a received data of the signals.

As described above, as the antenna 121 of the existing radio apparatus 12 has been removed, the directional antenna apparatus 11 is connected to the input terminal of the RF section's frequency converter 124 of the radio apparatus 12. This allows the directional antenna apparatus to be simply connected to the existing radio apparatus without changing the entire system of the radio apparatus. Also, since the weighting on the amplitude and the phase for the received signals is carried out by the digital signal processing, weighting on the amplitude and the phase can be stably effected, thereby reducing the size of the apparatus as compared with the weighting by the analog signal processing.

(Eleventh Embodiment)

This embodiment is explained about an example of a directional antenna apparatus equipped with only a receiver. While like components are denoted by like numerals as those of the tenth embodiment, different parts will be described.

Figure 16:
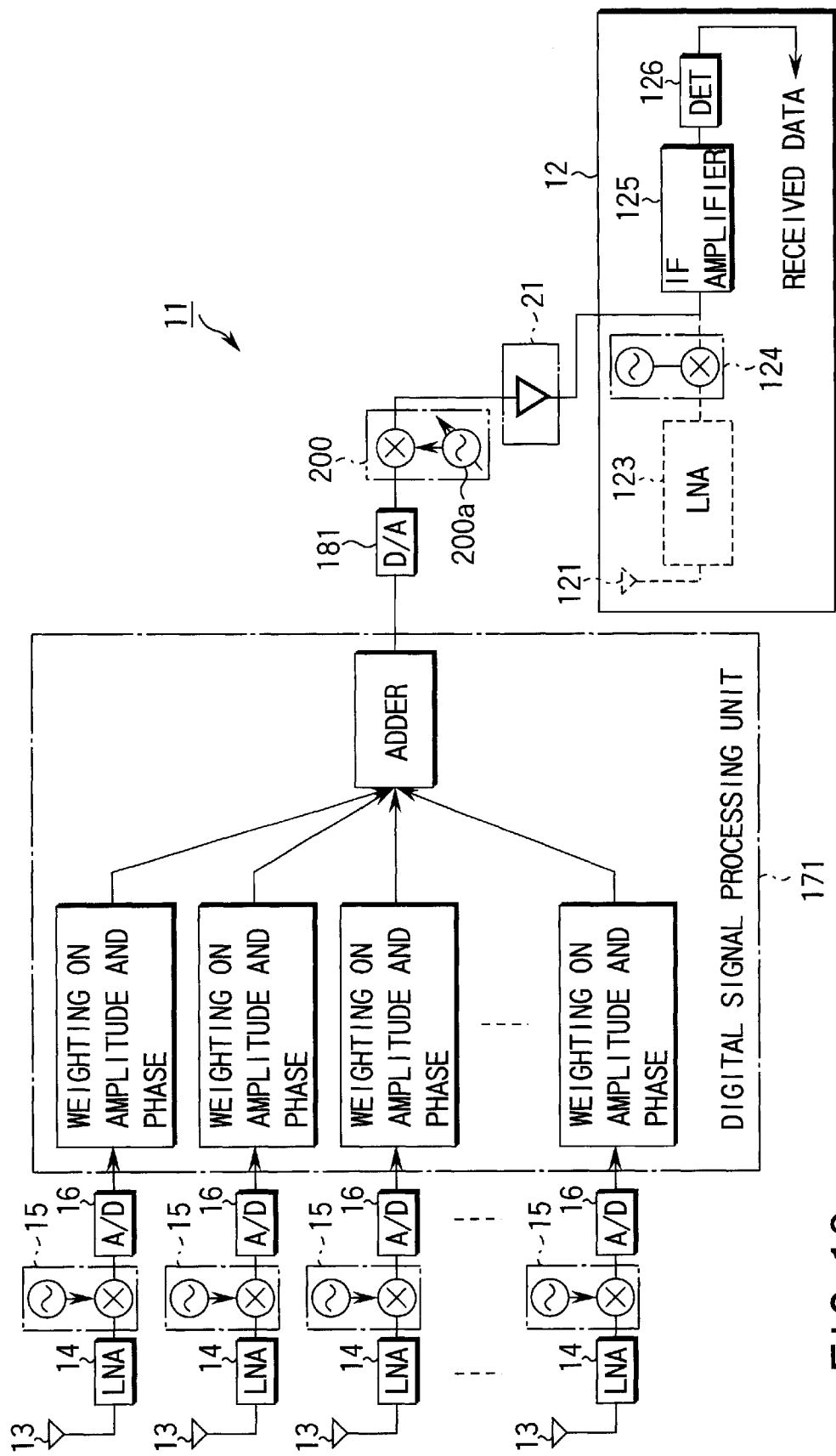
FIG. 16 is a block diagram showing an eleventh embodiment of the present invention.

As shown in FIG. 16, the digital signal processing unit 171 is provided as the digital signal processing means for weighting on the amplitude and the weight for digital-converted received signals for optimally controlling the directivity and adding the signals. The added signal by the digital signal processing unit 171 is converted to the analog signal by the D/A converter 181 and supplied to the frequency converter 200.

A frequency of a signal input to the frequency converter 200 by setting a frequency of the local oscillator 200a is converted to an IF band used in the radio apparatus 12 and supplies via the I/F unit 21 to an input terminal of an IF section's IF amplifier 125 in the radio apparatus 12. In the radio apparatus 12, the signal from the directional antenna apparatus 11 is amplified by the IF amplifier 125 and detected by the detector 126 to obtain a received data of the signals. The other arrangement is identical to that of the tenth embodiment.

According to the arrangement, as the antenna 121 of the radio apparatus 12 has been removed, the directional antenna apparatus 11 is connected to the input terminal of the IF section's IF amplifier 125 of the radio apparatus 12. This embodiment can also provide the same effect as of the tenth embodiment.

Also, in the tenth and eleventh embodiments, a frequency of the local oscillator 200a provided in the frequency converter 200 of the directional antenna apparatus 11 is variably set so that the directional antenna apparatus 11 to be connected to an optional position of the IF or RF unit of the receiver in the radio apparatus 12.

Moreover, in this embodiment, the digital signal processing unit 171 performs the adding processing, thus reducing the number of D/A converters to one and requiring no adder. Accordingly, the apparatus will further be minimized in the size.

(Twelfth Embodiment)

This embodiment is illustrated in an example of a directional antenna apparatus equipped with only a receiver. While like components are denoted by like numerals as those of the previous embodiments, different parts will be described.

Figure 17:
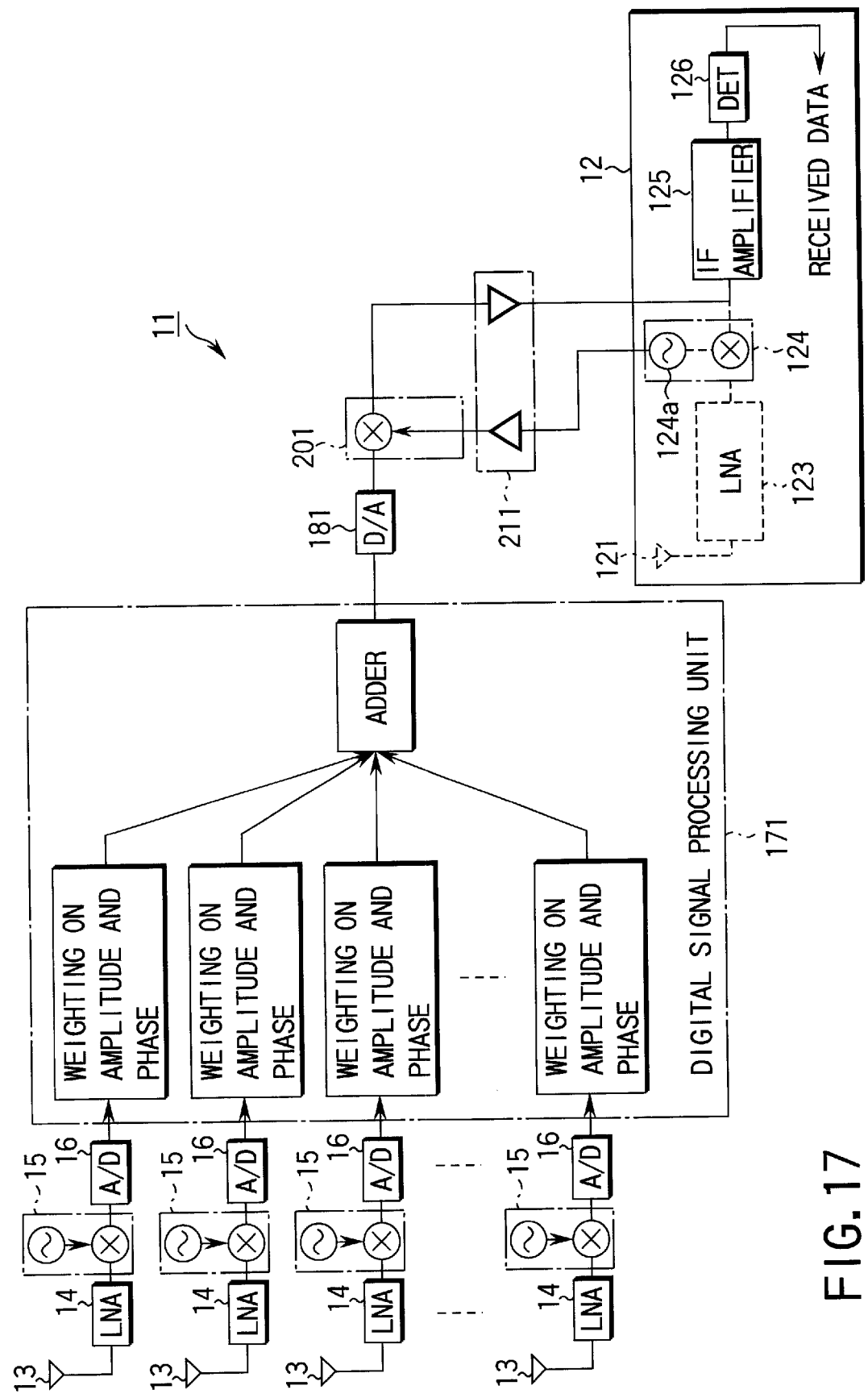
FIG. 17 is a block diagram showing a twelfth embodiment of the present invention.

As shown in FIG. 17, a frequency converter 201 is provided as the second receiving frequency converting means for taking in a frequency signal via an I/F unit 211 from the local oscillator 124a of the frequency converter 124 in the radio apparatus 12 which serves as an external signal source and frequency-converting a signal using this frequency signal. The signal frequency-converted to a IF band of the existing radio apparatus 12 from the frequency converter 201 is supplied via the I/F port 211 to an input terminal of an IF section's IF amplifier 125 of the radio apparatus 12. The other arrangement is identical to those of the eleventh embodiment.

The local oscillator 124a of the frequency converter 124 in the radio apparatus 12 creates an IF band. When the frequency-conversion is effected at the frequency converter 201 in the directional antenna apparatus 11 by using the frequency signal from the local oscillator 124a, the frequency-converted signal can be connected to the input terminal of the IF amplifier 125 of the radio apparatus via the I/F port 211.

This embodiment can also provided the same effect as of the tenth embodiment also in the above arrangement. In addition, a digital signal processing unit 171 is provided for weighting on the amplitude and the phase of received signals and then adding the weighted signals. Similarly to the eleventh embodiment, the number of D/A converters can be reduced to one while no adder is required. Accordingly, the apparatus of this embodiment will be minimized in the overall size. The frequency converter 201 in itself can be simpler in the arrangement.

(Thirteenth Embodiment)

This embodiment is explained about an example of a directional antenna apparatus equipped with only a receiver. While like components are denoted by like numerals as those of the previous embodiments, different parts will be described.

Figure 18:
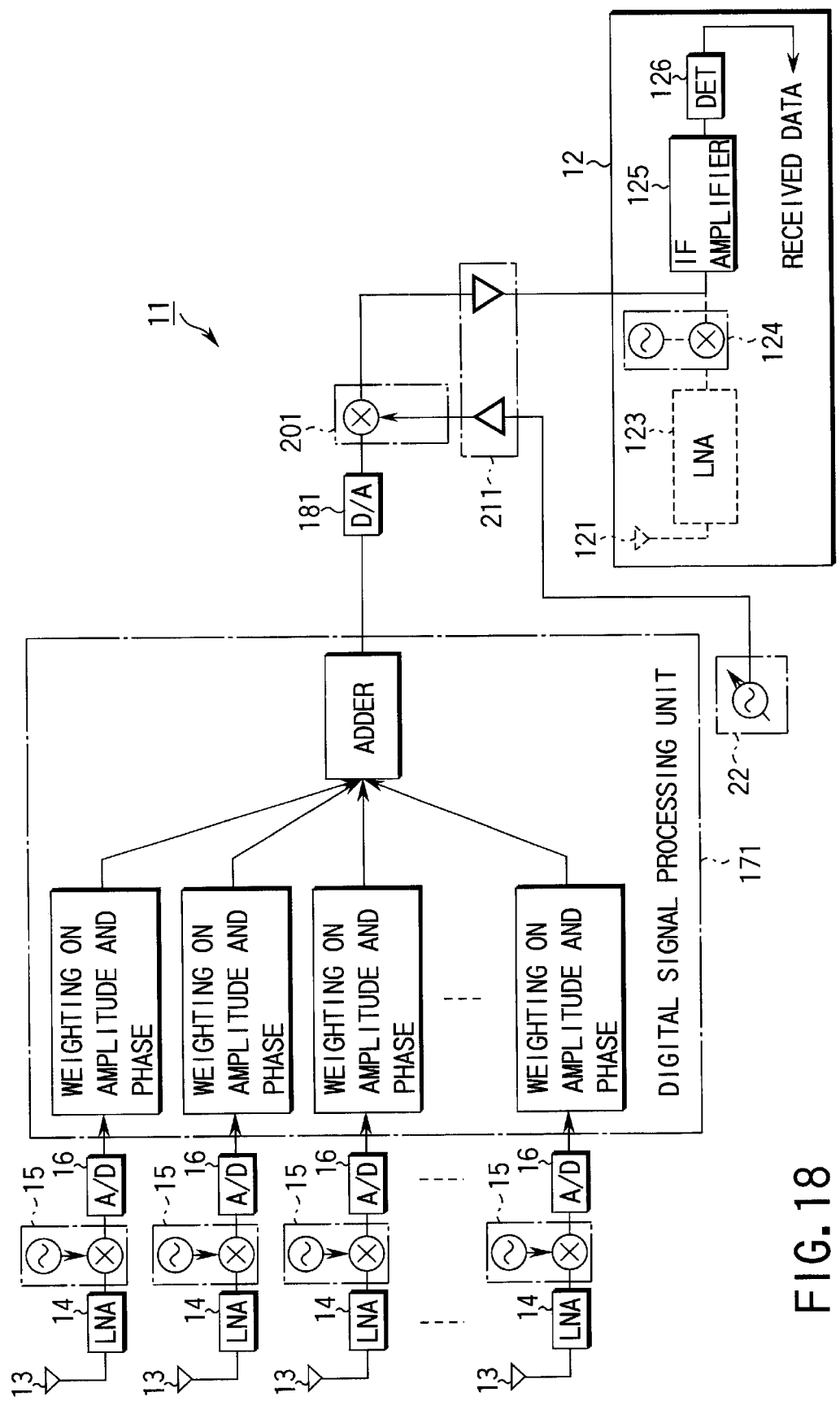
FIG. 18 is a block diagram showing a thirteenth embodiment of the present invention.

As shown in FIG. 18, the frequency converter 201 is provided as the second receiving frequency converting means for taking in a frequency signal via the I/F unit 211 from the local oscillator 22 which is an external signal source for variable frequencies and frequency-converting a signal using this frequency signal. The frequency-converted signal from the frequency converter 201 is supplied via the I/F unit 211 to the input terminal of the IF section's the IF amplifier 125 of the radio apparatus 12. The other arrangement is identical to those of the twelfth embodiment.

By setting the frequency of the local oscillator 22, the frequency converter 201 converts the signal to an IF band of the radio apparatus 12 and inputs the frequency-converted signal via the I/F unit 211 to the input terminal the IF section's IF amplifier 125 in the radio apparatus 12.

This embodiment can also provided the same effect as of the tenth embodiment. In addition, a digital signal processing unit 171 is provided for weighting on the amplitude and the phase of received signals and then adding the weighted signals. Similarly to the eleventh embodiment, the number of D/A converters can be reduced to one while no adder is required. Accordingly, the apparatus of this embodiment will be minimized in the overall size. The frequency converter 201 in itself can be simpler in the arrangement.

(Fourteenth Embodiment)

This embodiment is illustrated in an example of a directional antenna apparatus equipped with only a receiver. While like components are denoted by like numerals as those of the previous embodiments, different parts will be described.

Figure 19:
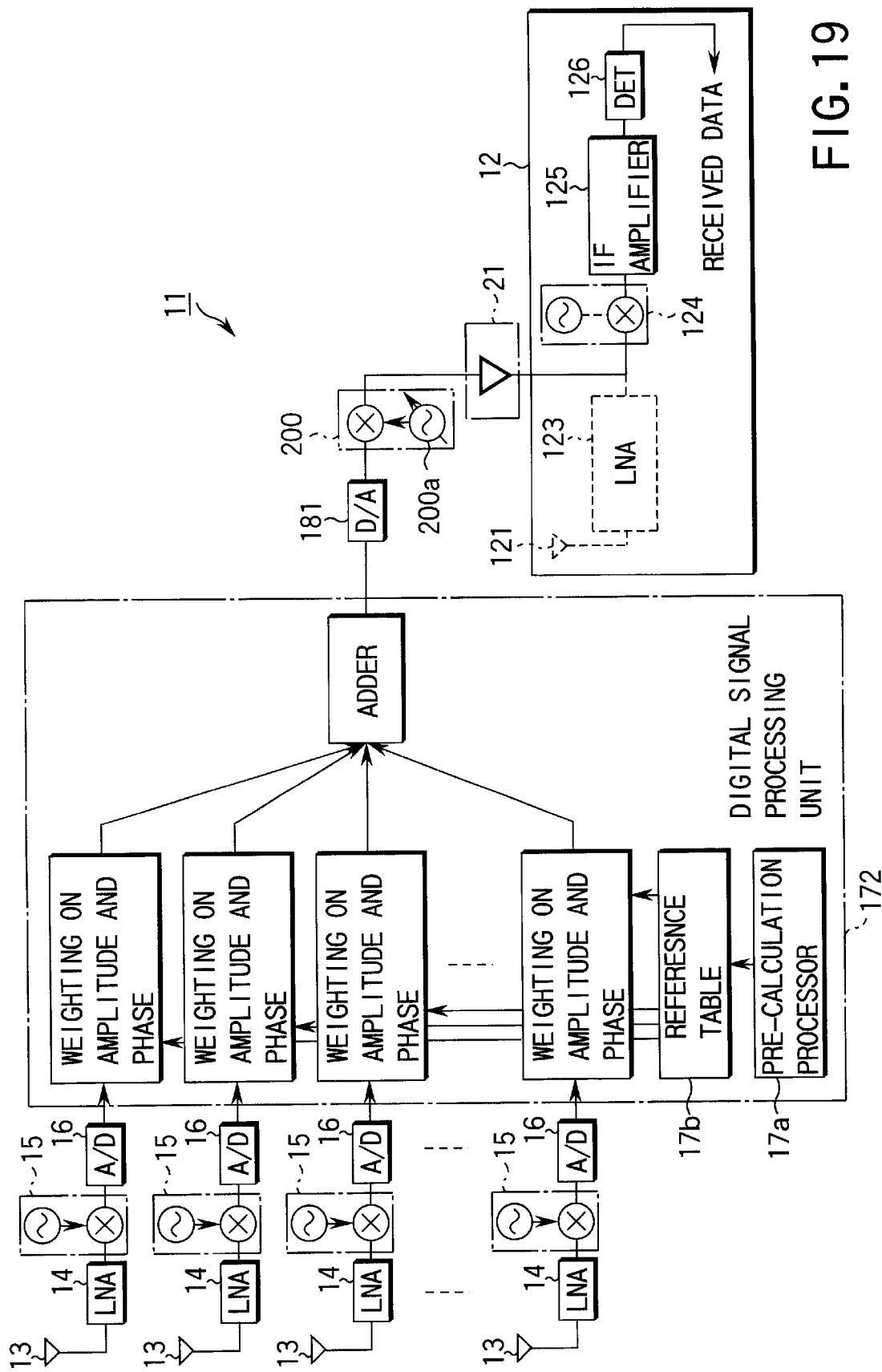
FIG. 19 is a block diagram showing a fourteenth embodiment of the present invention.

As shown in FIG. 19, the digital signal processing unit 172 is provided as the digital signal processing means for calculating weighting coefficients for the amplitude and the phase from a combination of the desired wave direction and undesired wave direction in a pre-calculation processing unit 17a to store the weighting coefficients in the reference table 17b, weighting the amplitude and the phase in accordance with the weighting coefficients stored in the reference table 17b for optimally controlling the directivity, and adding the weighted digital signals. The added digital signal from the digital signal processing unit 172 is converted into the analog signal by a D/A converter 181 and frequency-converted by the frequency converter 200, and supplied via an I/F unit 21 to the input terminal of the RF section's frequency converter 124 in the radio apparatus 12. The other arrangement is substantially identical to that of the eleventh embodiment.

This embodiment can also provide the same effect as of the tenth embodiment in such an arrangement. Similarly to the eleventh embodiment, the digital signal processing unit 172 performs the adding processing, hence decreasing the number of the D/A converters to one and requiring no adder. Accordingly, the apparatus will further be minimized in the size.

The reference table 17b is provided for weighting processing on the amplitude and the phase with weighting coefficients for the amplitude and the phase of the reference table 17b so that a change of weighting coefficients set by rewriting the contents of the reference table can be easily conducted, thereby weighting processing suitable for the environment of the radio wave propagation only by changing a weighting coefficient in the reference table 17b according to a change of the environment of the radio wave propagation.

This embodiment is based on but not limited to a case in which the digital signal processing unit for weighting on the amplitude and the phase of received signals and then adding the weighted signals is provided with the reference table. The digital signal processing unit for only weighting on the amplitude and the phase may be provided as in the tenth embodiment.

(Fifteenth Embodiment)

This embodiment is illustrated in an example of a directional antenna apparatus equipped with only a transmitter.

Figure 20:
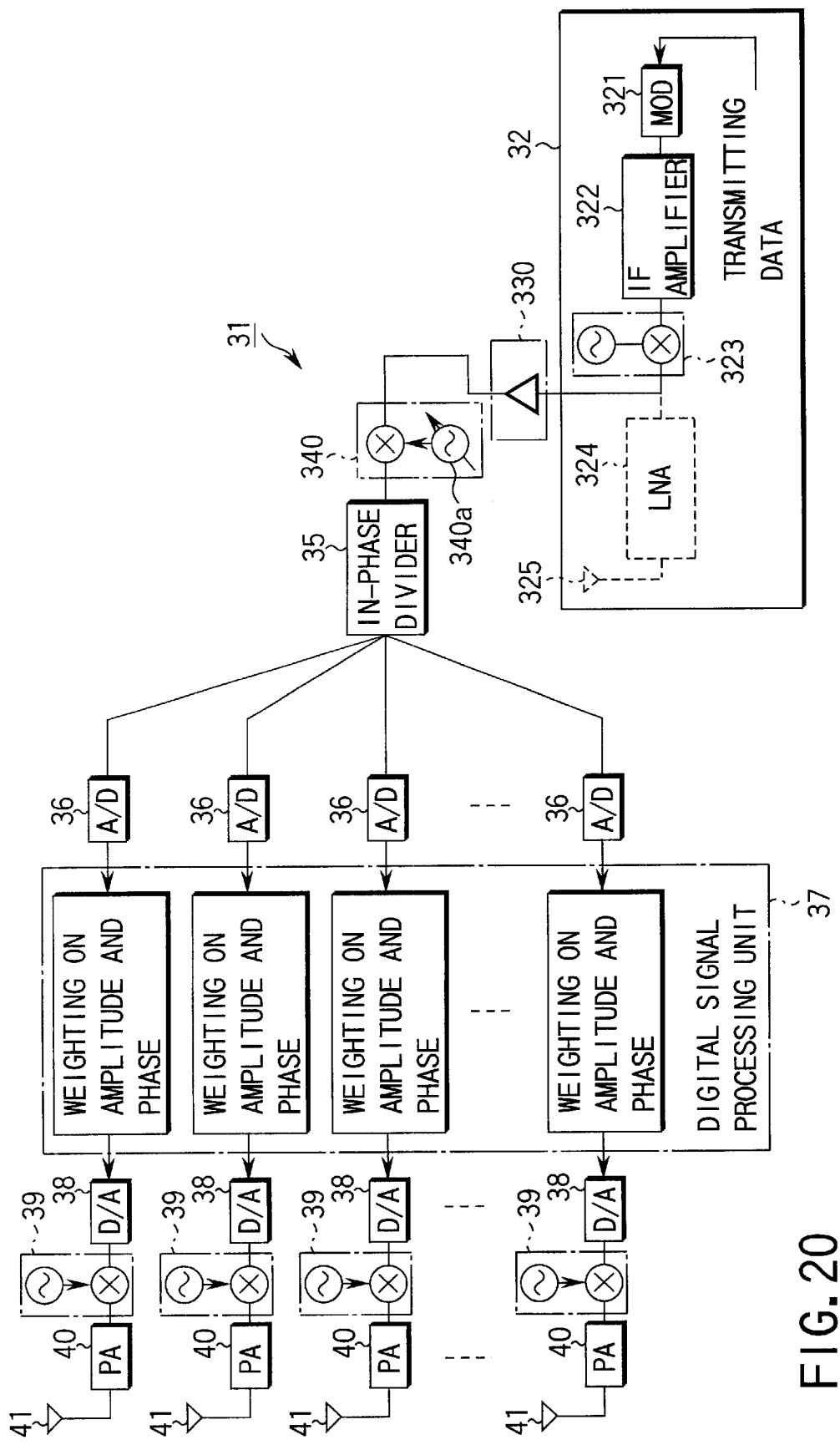
FIG. 20 is a block diagram showing a fifteenth embodiment of the present invention.

As shown in FIG. 20, a signal, which obtained after transmitting data is modulated by a modulator 321, amplified by a transmitter IF amplifier 322, and converted to an RF band signal by a transmitter frequency converter 323 in an existing radio apparatus 32, is supplied to the directional antenna apparatus 31. In general, the RF band signal from the frequency converter 323 is amplified by a power amplifier (PA) 324 and transmitted from an antenna 325 in the radio apparatus 32. In this embodiment, the antenna 325 is removed.

The directional antenna apparatus 31 takes in the RF frequency band from an output terminal of the RF section's the frequency unit 323 in the radio apparatus 32 via the I/F unit 330 to first transmitting frequency converting means or the frequency converter 340. The frequency converter 340 employs a local oscillator 340a capable of variably setting a frequency, and converts the input RF frequency signal into a lower frequency which can easily be processed by an in-phase divider 35 and a plurality of A/D converters 36 which converts in-phase divided signals by the in-phase divider 35 into the digital form.

The frequency-converted signals from the frequency converter 340 are divided into in-phase divided signals by the in-phase divider 35, and converted to the digital signals by the S/D converters 36, and supplied to the digital signal processing unit 37. The digital signal processing unit 37 comprises an one-chip micro-computer, a general-purpose CPU, or a DSP excellent in arithmetic operations. The digital signals from the A/D converters 36 are weighted on the amplitude and the phase by digital signal processing for optimally controlling the directivity and then supplied to the D/A converting means or the D/A converters 38.

The D/A converters 38 convert the digital signals to analog signals, and supplied to the second transmitting frequency converting means or frequency converters 39. The frequency converters 39 convert the analog signals into signals in a transmitting frequency band used in the radio apparatus 32. The frequency-converted signals are then amplified by the power amplifiers (PA) 40 and transmitted from the antenna elements 41. Thus, the directional antenna apparatus 31 performs an optimum directional control and transmits signal.

In this arrangement, the RF band signal from the output terminal of the RF section's frequency converter 323 of the radio apparatus 32 is taken in via the I/F unit 330 to the frequency converter 340, where it is converted to a lower frequency signal, and supplied to the in-phase divider 35. The in-phase divider 35 divides the lower frequency signal into a plurality of in-phase signals, which are then converted to the digital signals by the A/D converters 36 and supplied to the digital signal processing unit 37.

Next, the digital signals are weighted on the amplitude and the phase by the digital signal processing unit 37, converted to the analog signal by the D/A converters 38, and further converted by the frequency converters 39 to signals in a transmitting frequency band used in the radio apparatus 32. The frequency-converted signals are then amplified by the power amplifiers 40 and transmitted from the antenna elements 41 as the transmitting signal.

As described above, while the antenna 325 of the radio apparatus 32 has been removed, the directional antenna apparatus 31 is connected to the output terminal of the RF section's frequency converter 323 of the radio apparatus 32. Therefore, the directional antenna apparatus can easily be connected to the existing radio apparatus without changing the entire system of the radio apparatus. Moreover, the weighting on the amplitude and the phase of a transmitting signal is carried out by the digital signal processing, thus stably weighting the amplitude and the phase. Also, the apparatus can further be minimized in the overall size as compared with the weighting by the analog signal processing.

(Sixteenth Embodiment)

This embodiment is also illustrated in an example of a directional antenna apparatus equipped with only a transmitter. While like components are denoted by like numerals as those of the fifteenth embodiment, different parts will be described.

Figure 21:
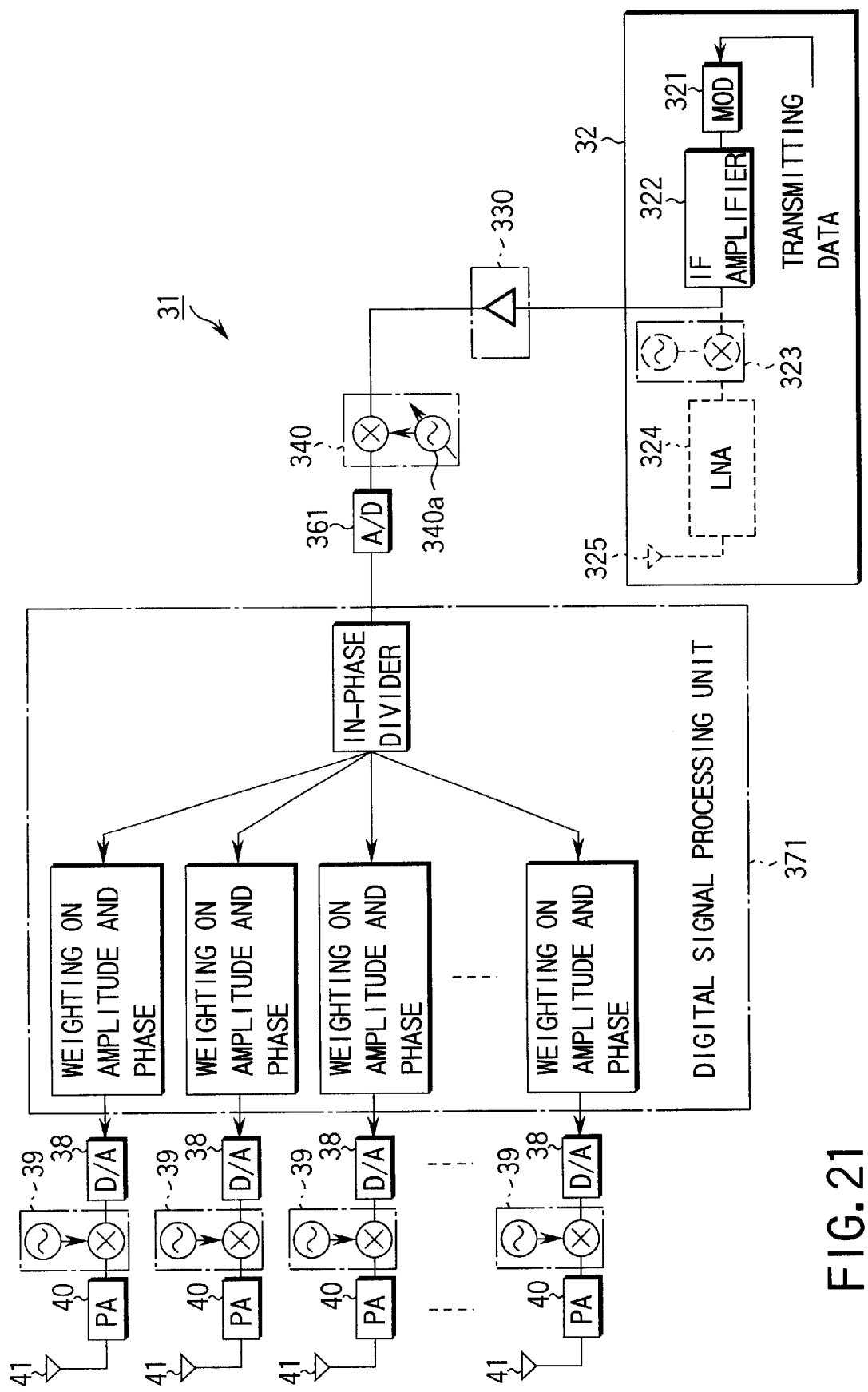
FIG. 21 is a block diagram showing a sixteenth embodiment of the present invention.

As shown in FIG. 21, the digital signal processing unit 371 is provided as the digital signal processing means for in-phase dividing a digital-converted transmitting signals and weighting on the amplitude and the phase of the in-phase divided signals for optimally controlling the directivity. A signal of IF band released from the output terminal of the IF section's IF amplifier 322 in the radio apparatus 32 is taken in via an I/F unit 330 by a frequency converter 340, then converted to a frequency signal that is determined by a local oscillator 340a and can easily be processed by an A/D converter 361. The frequency signal is converted to the digital signal by the A/D converter 361 and then supplied to the digital signal processing unit 371.

In the digital signal processing unit 371, the digital signals are in-phase divided and then weighted on the amplitude and the phase for optimally controlling the directivity. The weighted digital signals from the digital signal processing unit 371 are converted into the analog signals by the D/A converters 38. The other arrangement is substantially identical to that of the fifteenth embodiment.

According to the above arrangement, while the antenna 325 of the existing radio apparatus 32 has been removed, the directional antenna apparatus 31 is connected to the output terminal of the IF section's IF amplifier 322 of the radio apparatus 32. This embodiment can also provide the same effect as of the fifteenth embodiment.

In the fifteenth and sixteenth embodiments, the directional antenna apparatus 31 can easily be connected to an optional position of the transmitter IF or RF section of the existing radio apparatus 32 by variably setting the frequency of the local oscillator 340a provided in the frequency converter 340 of the directional antenna apparatus 31.

Moreover in this embodiment, the digital signal processing unit 371 carries out the in-phase dividing processing, hence reducing the number of the A/D converters to one and requiring no separate in-phase divider. The apparatus can further be minimized in the size.

(Seventeenth Embodiment)

This embodiment is illustrated in an example of a directional antenna apparatus equipped with only a transmitter. While like components are denoted by like numerals as those of the previous embodiments, different parts will be explained.

Figure 22:
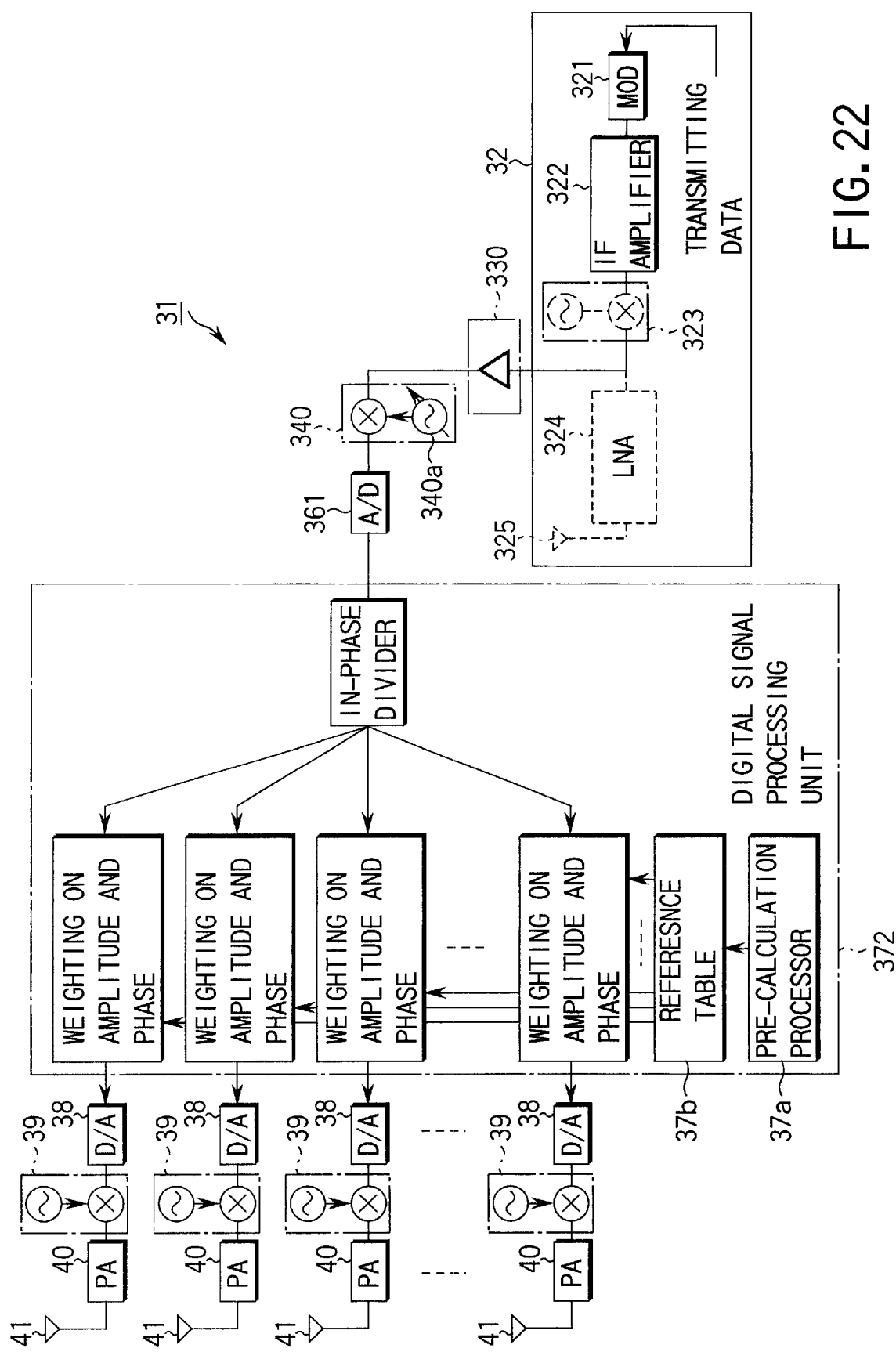
FIG. 22 is a block diagram showing a seventeenth embodiment of the present invention.

As shown in FIG. 22, the digital signal processing unit 372 is provided as the digital signal processing means for calculating weighting coefficients for the amplitude and the phase from a combination of the desired wave direction and undesired wave direction in a pre-calculation processor 37a to store the weighting coefficients in the reference table 37b, in-phase dividing a digital-converted signal, and weighting the amplitude and the phase of in-phase divided signals in accordance with the weighting coefficients stored in the reference table 37b for optimally controlling the directivity. The other arrangement is substantially identical to that of the sixteenth embodiment.

This embodiment can also provide the same effect as of the fifteenth embodiment. Similarly to the sixteenth embodiment, the number of the D/A converters can be reduced to one and no in-phase diving is required. Accordingly, the apparatus will further be minimized in the size.

The reference table 37b is provided for weighting processing on the amplitude and the phase with weighting coefficients for the amplitude and the phase of the reference table 37b so that a change of weighting coefficients set by rewriting the contents of the reference table can be easily conducted, thereby weighting processing suitable for the environment of the radio wave propagation only by changing a weighting coefficient in the reference table 37b according to a change of the environment of the radio wave propagation.

This embodiment is based on but not limited to a case in which the digital signal processing unit is provided with the reference table for in-phase dividing a signal and then weighting on the amplitude and the phase of in-phase divided signals. The digital signal processing unit for only weighting on the amplitude and the phase may be provided with the reference table.

(Eighteenth Embodiment)

This embodiment is illustrated in an example of a directional antenna apparatus equipped with both a receiver and a transmitter.

Figure 23:
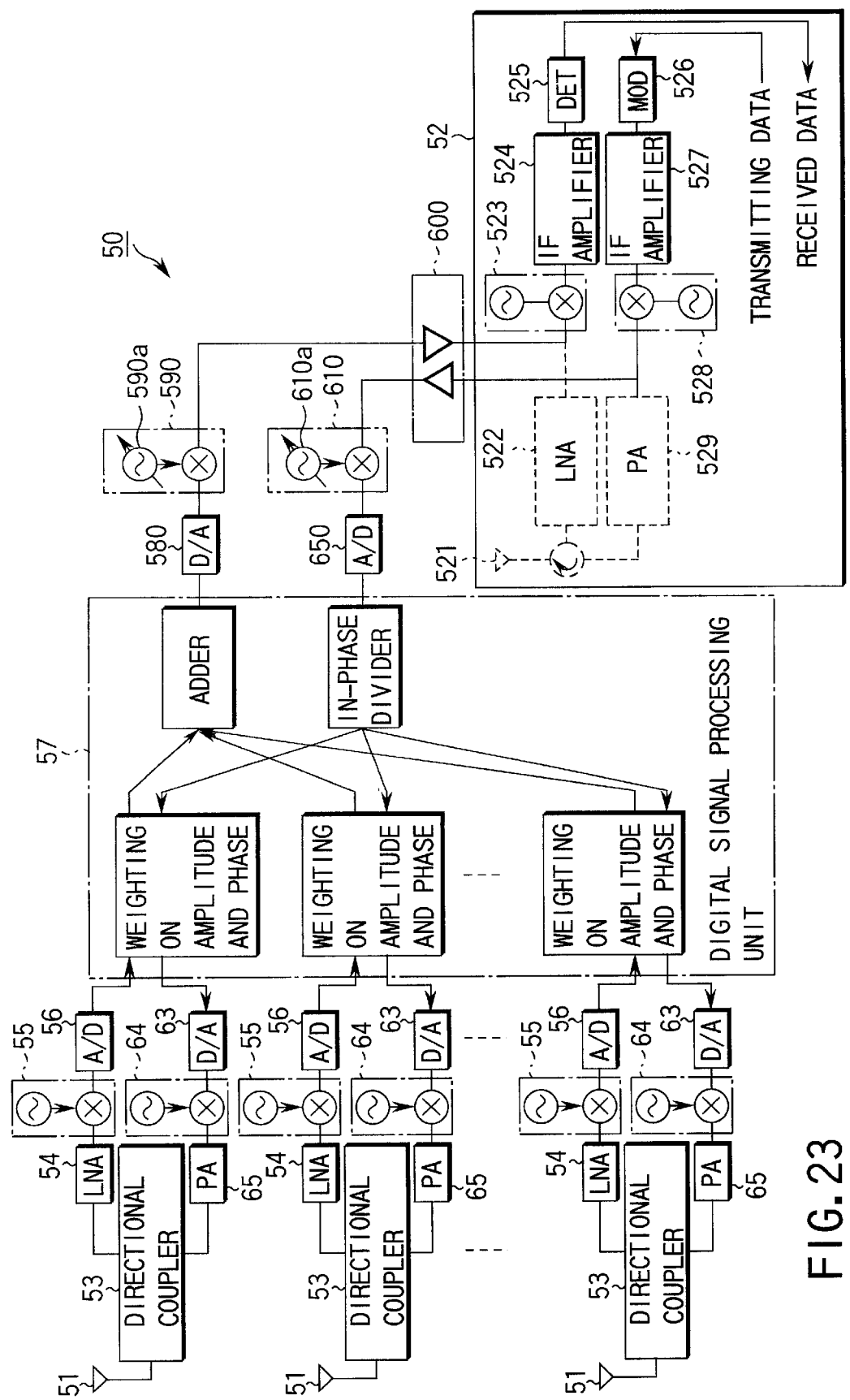
FIG. 23 is a block diagram showing an eighteenth embodiment of the present invention.

As shown in FIG. 23, the radio apparatus 52 comprises a low-noise amplifier (LNA) 522, a frequency converter 523, an IF amplifier 524, and a detector 525 in the receiver thereof to obtain received data from received signals, and a modulator 526, a power amplifier (PA) 527, a frequency converter 528, and an amplifier 529 in the transmitter thereof, which are used in the transmitting/receiving apparatus for converting transmitting data to a transmitting signal. As an antenna 521 of the radio apparatus 52 has been removed, the directional antenna apparatus 50 is connected to an optional position of the IF section or RF section of the radio apparatus 52.

The receiver of the directional antenna apparatus 50 receives signal in a receiving frequency band of the radio apparatus 52 at the antenna elements 51 of an adaptive array. The received signals are amplified by the low-noise amplifiers (LNA) 54 via the directional coupler section 53, and converted to lower frequency signals by first receiving frequency converting means or frequency converters 55. The received signals are changed to lower frequency signals by the frequency converters 55 because the lower frequency signals are favorable in the sensitivity, the selectivity, and the stability.

The frequency-converted signals from the frequency converters 55 are converted to the digital signals by the first analog/digital converting means or A/D converters 56, and supplied to a digital signal processing unit 57.

The digital signal processing unit 57 comprises a one-chip microcomputer, a general-purpose CPU, or a DSP excellent in the arithmetic processing. In the digital signal processing unit 57, the digital signals received from the A/D converters 56 are weighted with respect to the amplitude and the phase by digital signal processing for optimally controlling the directivity, and added. The added signal is then supplied to the first digital/analog converting means or D/A converters 580.

The digital signal processing unit 57 effects weighting the amplitude and the phase of the signals in accordance with, for example, predetermined and stored weighting coefficients for the amplitude and the phase, weighting coefficients calculated by comparing the preceding output with the current signal, or weighting coefficients, etc., calculated by comparing the preceding output with a reference signal of a desired signal.

The digital signal which is weighted a phase and amplitude optimally to be controlled in the directivity from the digital signal processing unit 57 and added is converted to the analog signal by a D/A converter 580, and supplied to second frequency converting means or frequency converter 590. The frequency converter 590 has a local oscillator 590a capable of variably setting a frequency and converts the frequency of the input signal to an RF band in the existing radio apparatus 52. The RF frequency signal is then supplied via an I/F unit 600 for matching with the radio apparatus 52 to the input terminal of the RF section's frequency converter 523 of the radio apparatus 52. Thus, the directional antenna apparatus 50 performs an optimum directional control and supplied the received signal to the input terminal of the RF section's frequency converter 523 of the radio apparatus 52. In the radio apparatus 52, the received signal from the directional antenna apparatus 50 is converted to an IF band by the frequency converter 523 and is amplified by the IF amplifier 524 and detected by the detector 525 to obtain receiving transmitting data of the signal.

In the transmitter of the directional antenna apparatus 50, the signal, which is obtained after the transmitting data is modulated by the modulator 526, amplified by the IF amplifier 527, and converted to the RF band signal by the frequency converter 528, is taken in via the I/F unit 600 by first transmitting frequency converting means or the frequency converter 610. The frequency converter 610 has a local oscillator 610a capable of variably setting a frequency and converts the input RF band signal to a lower frequency signal which can easily be processed by the second analog/digital converting means or the A/D converter 650 provided at the succeeding step.

The frequency-converted signal from the frequency converter 610 is converted to the digital signal by the A/D converter 650 and supplied to the digital signal processing unit 57. In the digital signal processing unit 57, the digital signal from the A/D converter 630 is in-phase divided, then weighted on the amplitude and the phase for optimally controlling the directivity and supplied to the second D/A converting means or the D/A converters 63.

The digital signals are then converted to the analog signals by the D/A converters 63 and supplied to the second transmitting frequency converting means or the frequency converters 64. The frequency converters 64 convert the input signal frequency up to a transmitting frequency band used in the radio apparatus 52. The frequency-converted signals are then amplified by the power amplifiers 65, and transmitted as the transmitting signal from the antenna elements 51 via the directional coupler 53. Thus, the directional antenna apparatus 50 performs an optimum directional control and transmits the signal.

According to the above arrangement, signals in a receiving frequency band of the radio apparatus 52 are received at the antenna elements 51, converted to lower frequency signals by the frequency converters 55, further converted to the digital signals by the A/D converters 56, and weighted on the amplitude and the phase and added up by the digital signal processing unit 57, the digital signals are output to the D/A converter 58. The digital signal is converted to the analog signal by the D/A converter 580, converted to an RF band the existing radio apparatus 52 by the frequency converter 590, and supplied via the I/F unit 600 to the input terminal of the RF section's frequency converter 523 of the radio apparatus 52.

In the radio apparatus 52, the signal from the directional antenna apparatus 50 is converted to an IF band signal by the frequency converter 523, amplified by the IF amplifier 524, and detected by the detector 525 to obtain received data of the signal.

When transmitting the transmitting data, the transmitting signal, which is obtained after the transmitting data is modulated by the modulator 526, amplified by the IF amplifier 527, frequency-converted by the frequency converter 528 in the radio apparatus 52, is taken in via the I/F unit 600 to the frequency converter 610 of the directional antenna apparatus 50, where it is converted to a lower frequency signal. The frequency-converted signal is converted by the A/D converter 650 to the digital signal, and supplied to the digital signal processing unit 57.

In the digital signal processing unit 57, the digital signal is in-phase divided and weighted on the amplitude the phase. The digital signals weighted by the digital signal processing unit 57 are converted to the analog signals by the D/A converters 63 and further converted by the frequency converters 64 to signals in a transmitting frequency band of the radio apparatus 52. The frequency-converted signals are amplified by the power amplifiers 65, and transmitted as the transmitting signal from the antenna elements 51 via the directional coupler 53.

As described above, while the antenna 521 of the radio apparatus 52 has been removed, the directional antenna apparatus 50 is simply connected at the receiver to the input terminal of the RF section's frequency converter 523 and at the transmitter to the output terminal of the RF section's frequency converter 528 in the radio apparatus 52. Accordingly, the directional antenna apparatus can easily be connected to the existing radio apparatus with changing the entire system of the radio apparatus. Also, the weighting on the amplitude and the phase for both a received signal and a transmitting signal is carried out by the digital signal processing, thereby stably effecting weighting. The size of the apparatus can be decreased as compared by the analog signal processing.

(Nineteenth Embodiment)

This embodiment is illustrates in the form of a directional antenna apparatus equipped with both a receiver and a transmitter. While like components are denoted by like numerals as those of the eighteenth embodiment, different parts will be explained.

Figure 24:
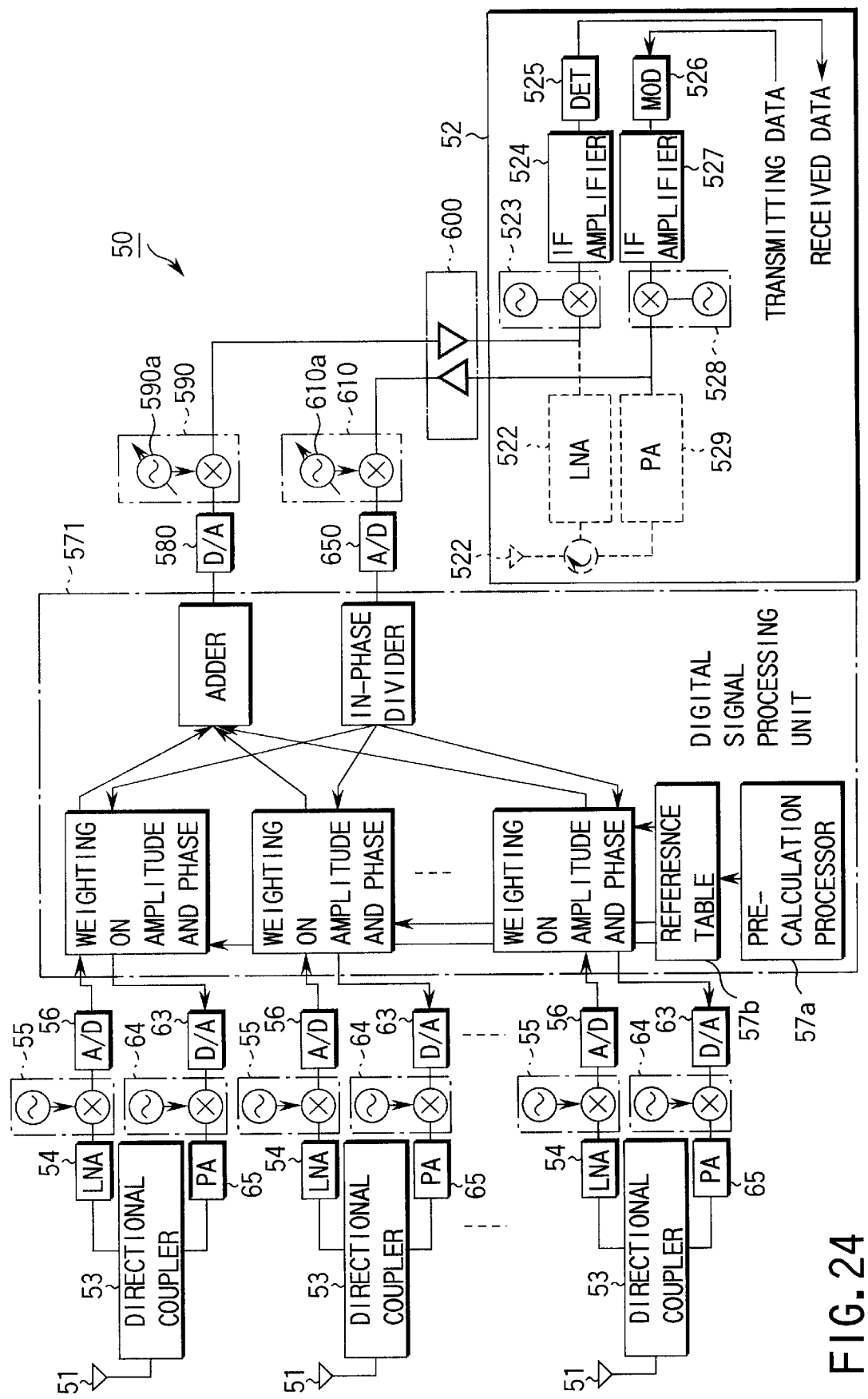
FIG. 24 is a block diagram showing a nineteenth embodiment of the present invention.

As shown in FIG. 24, a digital signal processing unit 571 is provided as the digital signal processing means for calculating weighting coefficients for the amplitude and the phase from a combination of the desired wave direction and undesired wave direction in a pre-calculation processing unit 57a to store the weighting coefficients in a reference table 57b, weighting the amplitude and the phase of a plurality of digital-converted signals by the A/D converters 56 in accordance with the weighting coefficients stored in the reference table 57b for optimally controlling the directivity and adding the weighted digital signals, and outputting to the D/A converter 580, and in-phase dividing a digital-converted signal by an A/D converter 650 weighting the amplitude and the phase of in-phase divided signals in accordance with the weighting coefficients stored in the reference table 37b for optimally controlling the directivity, and outputting to the D/A converters 63. The other arrangement is substantially identical to that of the ninth embodiment.

Figure 25:
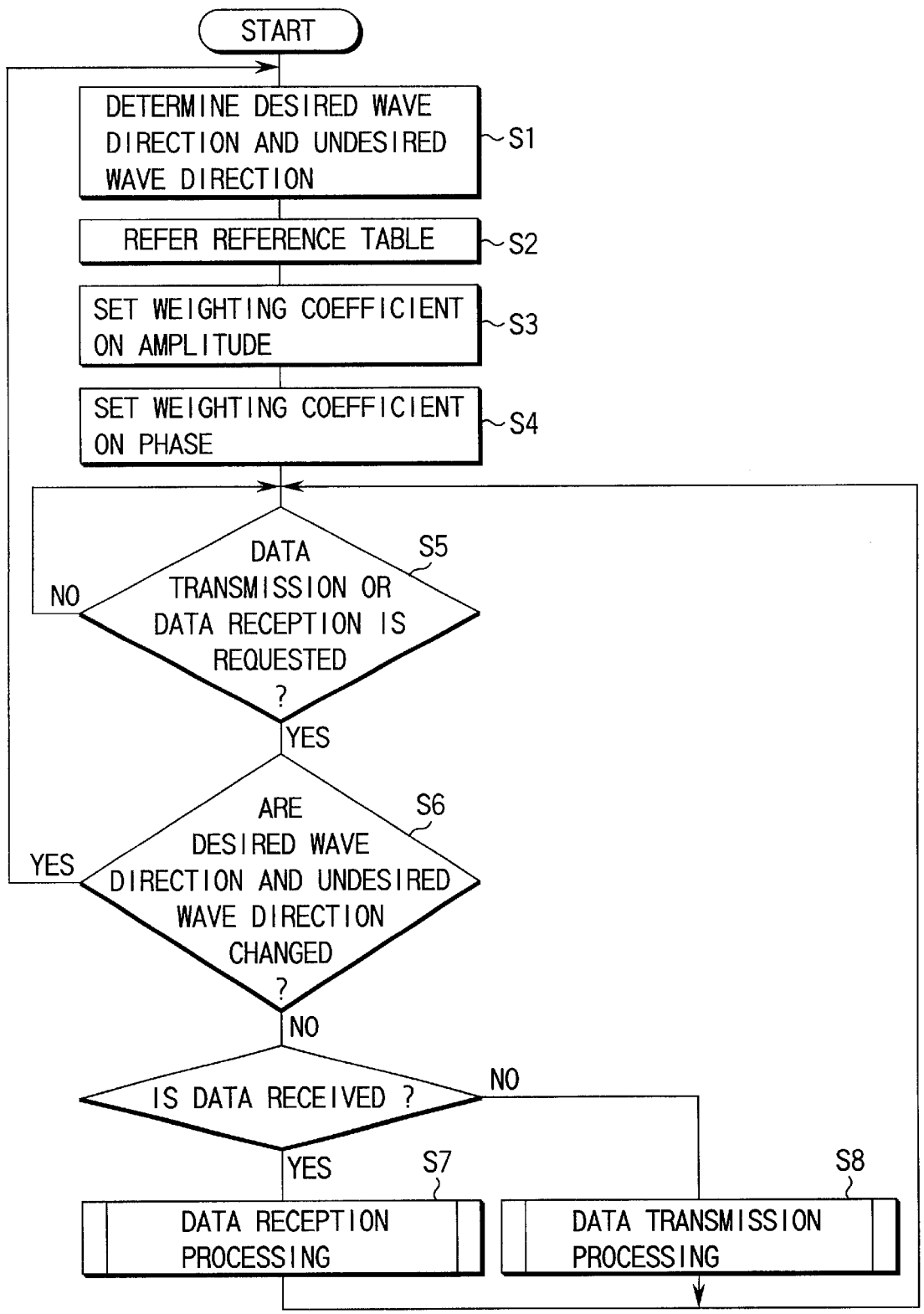
FIG. 25 is a flowchart showing a processing of a digital signal processing unit in the embodiment.

The processing of the digital signal processing unit 571 will be now explained in more detail. As shown in FIG. 25, in Step S1, the desired wave direction and the undesired wave direction are determined. Step S2 follows, where the weighting coefficients for the amplitude and the phase stored in the reference table 57b are referred in the pre-calculation processing unit 57a with the combination of the desired wave direction and the undesired wave direction. Then, the weighting coefficients for the amplitude are determined at Step S3 and the weighting coefficients for the phase are determined at Step S4. The procedure then goes to Step S5, and waits until the transmission or reception of data is demanded.

When the transmission or reception of data is requested, the desired wave direction and the undesired wave direction are confirmed at Step S6. If a change occurs, the processings at Steps S1 to S4 are repeated for determining the weighting coefficients on the amplitude and the phase referring a new weighting coefficient on the amplitude and the phase in the reference table 57b. If no change is made, the transmission or reception of data is started. If the data reception is requested, the data reception processing is effected at Step S7. If the data transmission is requested, the data transmission processing is effected at Step S8.

Figure 26:
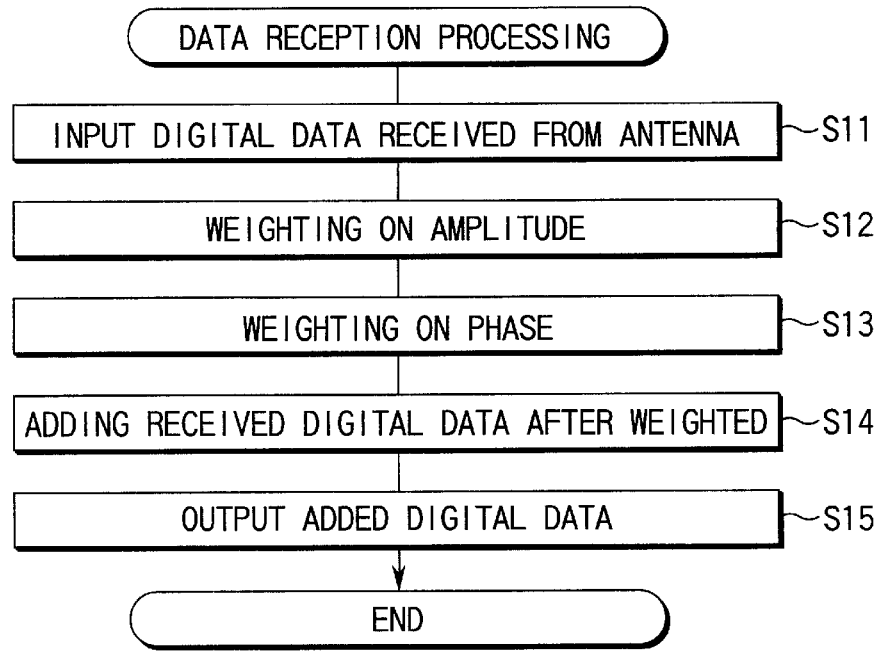
FIG. 26 is a flowchart specifically showing a data receiving processing shown in FIG. 25.

In the data reception processing, the signals received at the antenna elements 51 are input as digital signals by the AID converters 56 at Step S11, as shown in FIG. 26. Then, Steps S12 and S13 follow, where the weighting on the amplitude and the phase are effected using the weighting coefficients in the reference table 57b. At Step S14, the weighted digital signals are added to obtain a digital signal, which is then output to the D/A converter 58.

Figure 27:
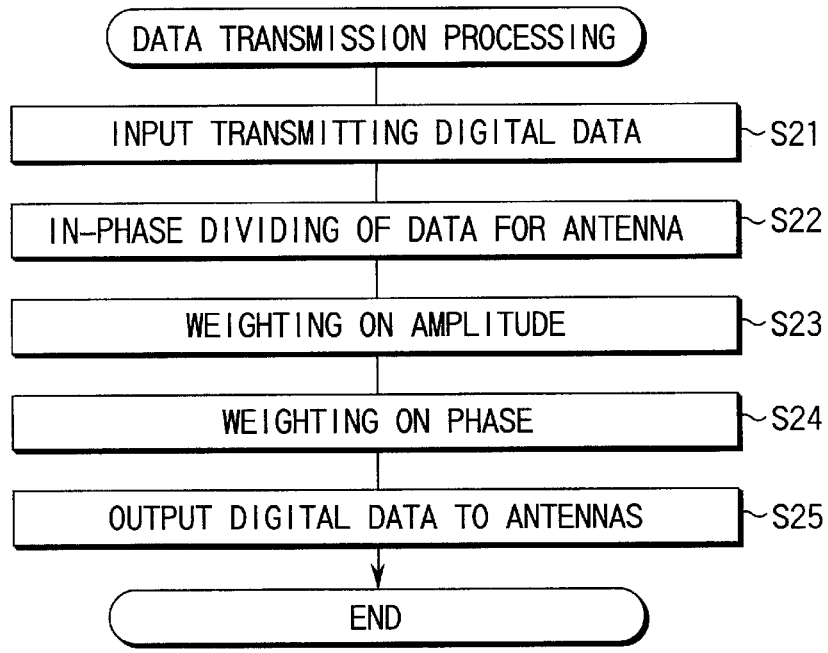
FIG. 27 is a flowchart showing explicitly a procedure of data transmitting process shown in FIG. 25.

In the data transmission means, as shown in FIG. 27, the digital signal is input from the AID converter 62 at Step S21. Step S22 follows, where the input digital signal is in-phase divided for the antenna elements 51. This is followed by Steps S23 and S24 for weighting the amplitude and the phase of the in-phase divided digital signals using the weighting coefficients in the reference table 57b. At Step S25, the obtained digital signals are output to the D/A converters 63.

This embodiment can also provide the same effect as of the eighteenth embodiment in the above arrangement.

The reference table 17b is provided to conduct weighting processing on the amplitude and the phase with weighting coefficients for the amplitude and the phase of the reference table 17b so that a change of weighting coefficients set by rewriting the contents of the reference table can be easily conducted, thereby conducting weighting processing suitable for the environment of the radio wave propagation only by changing a weighting coefficient in the reference table 17b according to a change of the environment of the radio wave propagation.

This embodiment is based on but not limited to a case in which the digital signal processing unit is provided with the reference table for, when receiving, weighting the amplitude and the phase of each received signal, and adding the weighted signals, and when transmitting, in-phase dividing a signal, and weighting the amplitude and the phase of in-phase divided signals. The digital signal processing unit for only weighting the amplitude and the phase when both receiving and transmitting may be provided with the reference table. In this case, a separate adder and a separate in-phase divider have to be provided.

Figure 28:
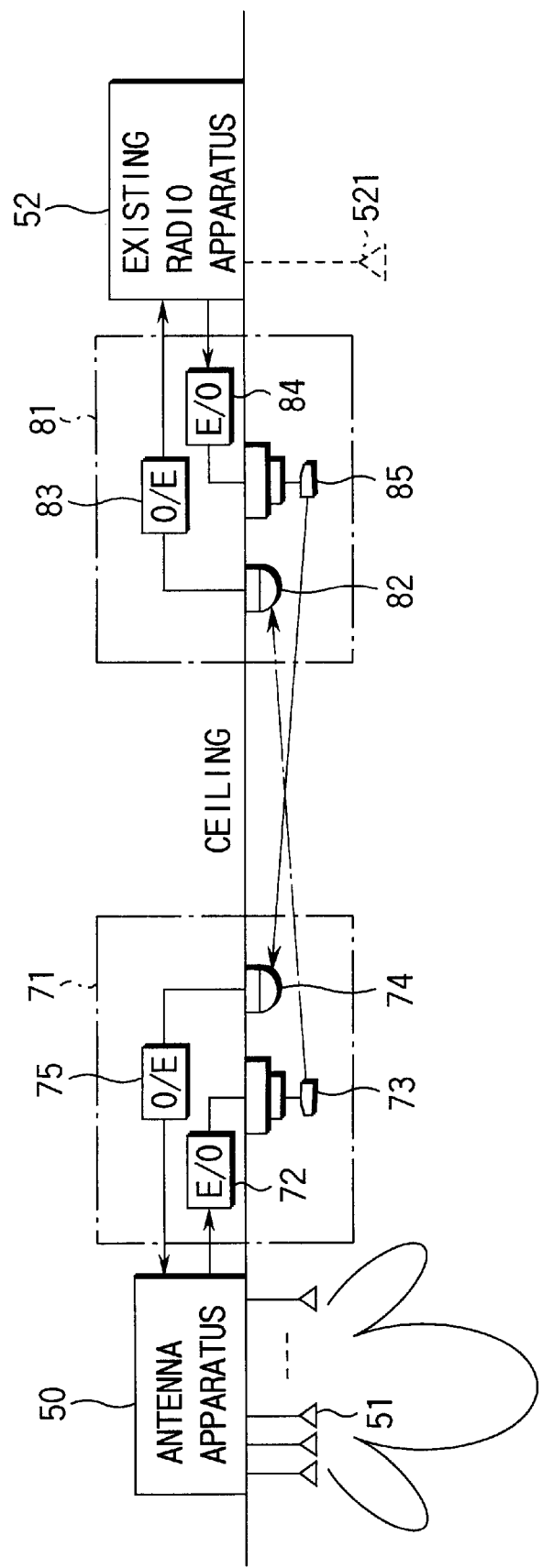
FIG. 28 is a schematic view showing a signal transmitting/receiving interface between the directional antenna apparatus and an existing radio apparatus.
Figure 29:
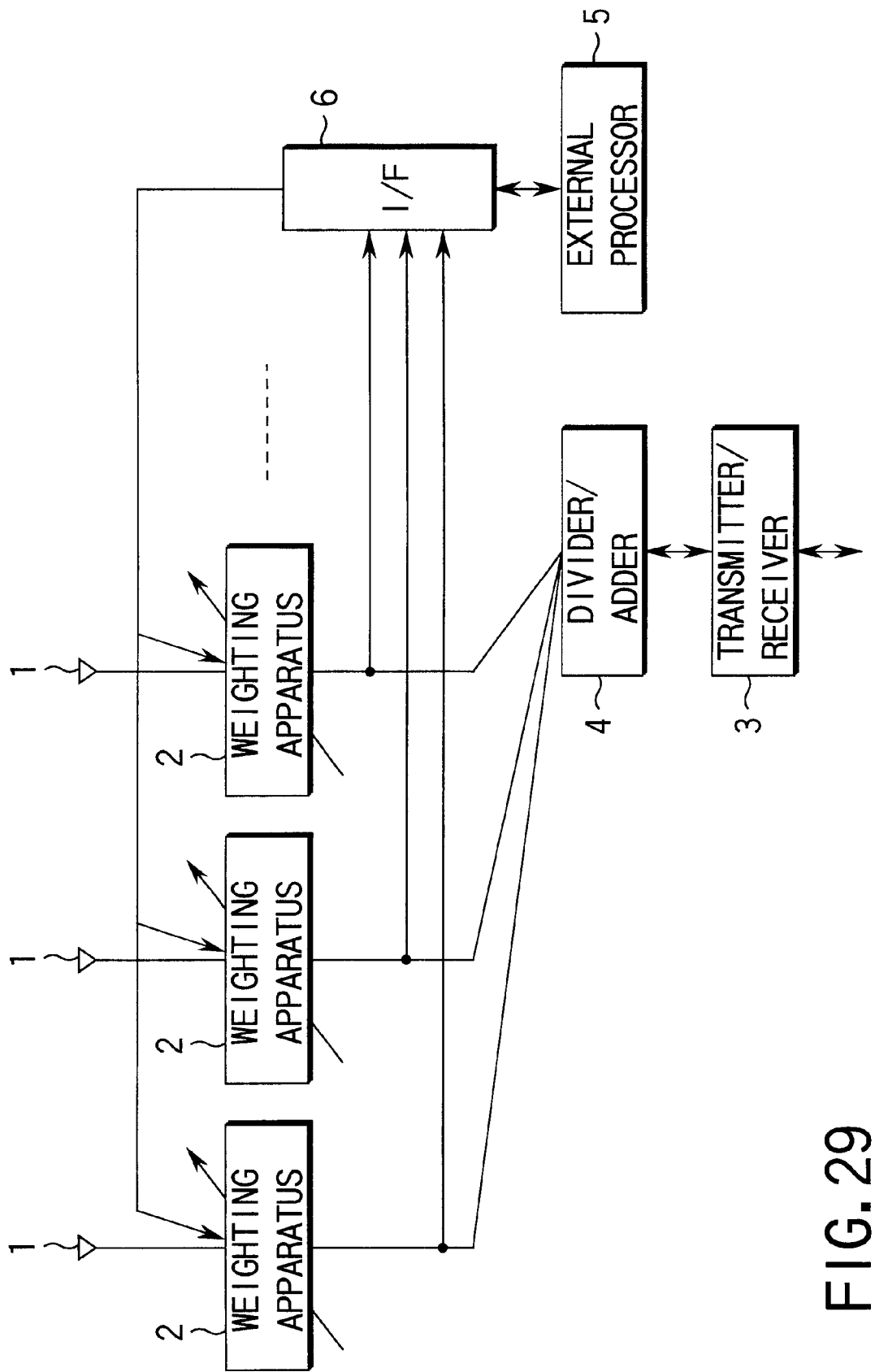
FIG. 29 is a block diagram showing a conventional antenna apparatus.

Also, the interface unit for matching between the directional antenna apparatus 50 and the radio apparatus 52 is not limited to such an electrically connected interface as illustrated in the eighteenth embodiment and the nineteenth embodiment but may be an optical communications interface as shown in FIG. 28.

For example, the directional antenna apparatus 50 may be connected to a first optical transmitting/receiving apparatus 71 while the radio apparatus 52 is connected to a second optical transmitting/receiving apparatus 81. The first optical transmitting/receiving apparatus 71 comprises a first electric/optical (E/O) converter 72 and a first emitter 73 such as an infrared ray emitting diode in a transmitter section, as well as a first detector 74 such as a PIN photo-diode and a first optical/electric (O/E) converter 75 in a receiver section. The second optical transmitting/receiving apparatus 81 comprises a second detector 82 such as a PIN photo-diode and a second optical/electric (O/E) converter 83 in a receiver section, as well as a second electric/optical (E/O) converter 84 and a second emitter 85 such as an infrared ray emitting diode in a transmitter section.

In such an arrangement, the signal in the receiving frequency band of the existing radio apparatus 52 received by the directional antenna apparatus 50 is converted to an optical signal by the first E/O converter 72 of the first optical transmitting/receiving apparatus 71 and optical communication is conducted from the first emitter 73 to the second detector 82 of the second optical transmitting/receiving apparatus 81. The optical signal received by the second detector 82 is then returned to the original received signal by the second O/E converter 83, and supplied to the radio apparatus 52.

Further, the transmitting signal from the radio apparatus 52 is converted to an optical signal by the second E/O converter 84 of the second optical transmitting/receiving apparatus 81 and then optical communication is conducted from the second emitter 85 to the first detector 74 of the first optical transmitting/receiving apparatus 71. The optical signal received by the first detector 74 is then returned to the original transmitting signal in the transmitting frequency band of the existing radio apparatus 52 by the first O/E converter 75, and supplied to the directional antenna apparatus 50.

Using such optical interfaces, the directional antenna apparatus 50 can be spaced by a distance from the radio apparatus 52.

As no cables are provided between the directional antenna apparatus 50 and the radio apparatus 52, the two optical transmitting/receiving apparatuses 71 and 81 can arbitrarily be mounted at any desired locations thus obtain freedom of the installation.

Alternatively, the apparatuses may be implemented by other radio apparatus, instead of the described optical type.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A directional antenna apparatus having a plurality of antenna elements for controlling directivity, comprising:

first receiving frequency converting means for converting frequencies of signals received by the plurality of antenna elements;

weighting means for weighting an amplitude and a phase of the converted signals converted by the first receiving frequency converting means;

adding means for adding the signals weighted by the weighting means; and second receiving frequency converting means for converting a frequency of the signal added by the adding means to an original frequency of the received signals.

2. A directional antenna apparatus having a plurality of antenna elements for controlling directivity, comprising:

first receiving frequency converting means for converting frequencies of signals received by the plurality of antenna elements;

analog/digital converting means for converting the signals converted by the first receiving frequency converting means into digital signals;

digital signal processing means for digital processing to weight the digital signals converted by the analog/digital converting means on an amplitude and a phase;

digital/analog converting means for converting the signals weighted by the digital signal processing means into analog signals;

adding means for adding the analog signals converted by the digital/analog converting means; and second receiving frequency converting means for converting a frequency of the analog signal added by the adding means to an original frequency of the received signals.

3. A directional antenna apparatus according to claim 2, wherein the digital signal processing means includes a reference table in which the weighting coefficients for the amplitude and the phase calculated from a combination of a desired wave direction and an undesired wave direction are stored, and weights on the amplitude and the phase in accordance with the weighting coefficients are stored in the reference table.

4. A directional antenna apparatus having a plurality of antenna elements for controlling directivity, comprising:

first receiving frequency converting means for converting frequencies of signals received by the plurality of antenna elements;

analog/digital converting means for converting the signals converted by the first receiving frequency converting means into digital signals;

digital signal processing means for digital processing to weight the digital signals converted by the analog/digital converting means on an amplitude and a phase and then add the weighted signals;

digital/analog converting means for converting the digital signal added by the digital signal processing means into an analog signal; and second receiving frequency converting means for converting a frequency of the analog signal converted by the digital/analog converting means to an original frequency of the received signals.

5. A directional antenna apparatus according to claim 4, wherein the digital signal processing means includes a reference table in which the weighting coefficients for the amplitude and the phase calculated from a combination of a desired wave direction and an undesired wave direction are stored, and weights on the amplitude and the phase in accordance with the weighting coefficients are stored in the reference table.

6. A directional antenna apparatus having a plurality of antenna elements for controlling directivity, comprising:

first transmitting frequency converting means for converting a frequency of a transmitting signal;

in-phase dividing means for in-phase dividing the signal converted by the first transmitting frequency converting means for the antenna elements;

weighting means for weighting the signals in-phase divided by the in-phase dividing means on an amplitude and a phase; and second transmitting frequency converting means for converting each frequency of the signals weighted by the weighting means to an original frequency of the transmitting signal and supplying the signals to the plurality of antenna elements.

7. A directional antenna apparatus having a plurality of antenna elements for controlling directivity, comprising:

first transmitting frequency converting means for converting a frequency of a transmitting signal;

in-phase dividing means for in-phase dividing the signal converted by the first transmitting frequency converting means for the plurality of antenna elements;

analog/digital converting means for converting the signals in-phase divided by the in-phase dividing means into digital signals;

digital signal processing means for digital processing to weight the digital signals converted by the analog/digital converting means on an amplitude and a phase;

digital/analog converting means for converting the signals weighted by the digital signal processing means into analog signals; and second transmitting frequency converting means for converting each frequency of the analog signals converted by the digital/analog converting means to an original frequency of the transmitting signal and supplying the converted signals to the plurality of antenna elements.

8. A directional antenna apparatus according to claim 7, wherein the digital signal processing means includes a reference table in which weighting coefficients for the amplitude and the phase calculated from a combination of a desired wave direction and an undesired wave direction are stored, and weights on the amplitude and the phase in accordance with the weighting coefficients are stored in the reference table.

9. A directional antenna apparatus having a plurality of antenna elements for controlling directivity, comprising:
  first transmitting frequency converting means for converting a frequency of a transmitting signal;
  analog/digital converting means for converting the signal converted by the first transmitting frequency converting means into a digital signal;
  digital signal processing means for digital processing to in-phase divide the digital signal converted by the analog/digital converting means for the plurality of antenna elements and then weight the in-phase divided signals on an amplitude and a phase;
  digital/analog converting means for converting the signals weighted by the digital signal processing means into analog signals; and
  second transmitting frequency converting means for converting each frequency of the analog signals converted by the digital/analog converting means to an original frequency of the transmitting signal and supplying the signals to the plurality of antenna elements.

10. A directional antenna apparatus according to claim 9, wherein said digital signal processing means includes a reference table in which weighting coefficients for the amplitude and the phase calculated from a combination of a desired wave direction and an undesired wave direction are stored, and weights on the amplitude and the phase of the digital signals in accordance with the weighting coefficients are stored in the reference table.

11. A directional antenna apparatus having a plurality of antenna elements for controlling directivity, comprising:
  first receiving frequency converting means for converting frequencies of signals received by the plurality of antenna elements;
  weighting means for weighting an amplitude and a phase of the signals converted by the first receiving frequency converting means;
  adding means for adding the signals weighted by the weighting means;
  second receiving frequency converting means for converting a frequency of the signal added by the adding means to an original frequency of the receiving signals;
  first transmitting frequency converting means for converting a frequency of a transmitting signal;
  in-phase dividing means for in-phase dividing the signal converted by the first transmitting frequency converting means for the plurality of antenna elements;
  weighting means for weighting the signals in-phase divided by the in-phase dividing means on an amplitude and a phase; and
  second transmitting frequency converting means for converting each frequency of the signals weighted by the weighting means to the original frequency of the transmitting signal and supplying the signals to the plurality of antenna elements.

12. A directional antenna apparatus having a plurality of antenna elements for controlling directivity, comprising:
  a receiver;
  a transmitter;
  a directional coupler for sharing the plurality of antenna elements with the receiver and the transmitter;
  switching means for switching between reception and transmission; and
  digital signal processing means for digital processing to weight each signal on an amplitude and a phase, wherein
  the receiver comprises:
    first receiving frequency converting means for converting frequencies of signals received by the plurality of antenna elements;
    first analog/digital converting means for converting the signals converted by the first receiving frequency converting means into digital signals to supply the digital signals to the digital signal processing means;
    first digital/analog converting means for converting the digital signals weighted by the digital signal processing means into analog signals;
    adding means for adding the analog signals converted by the first digital/analog converting means; and
    second receiving frequency converting means for converting back a frequency of the added signal to an original frequency of the received signals, and wherein
  the transmitter comprises:
    first transmitting frequency converting means for converting a frequency of a transmitting signal;
    in-phase dividing means for in-phase dividing the transmitting signal converted by the first transmitting frequency converting means for the plurality of antenna elements;
    second analog/digital converting means for converting the signals in-phase divided by the in-phase dividing means into digital signals to supply the digital signals to the digital signal processing means;
    second digital/analog converting means for converting the digital signals weighted by the digital signal processing means into analog signals; and
    second transmitting frequency converting means for converting each frequency of the analog signals to an original frequency of the transmitting signal and supplying the converted analog signals to the plurality of antenna elements.

13. A directional antenna apparatus according to claim 12, wherein said digital signal processing means includes a reference table in which weighting coefficients for the amplitude and the phase calculated from a combination of a desired wave direction and an undesired wave direction are stored, and weights on the amplitude and the phase of the digital signals in accordance with the weighting coefficients are stored in the reference table.

14. A directional antenna apparatus having a plurality of antenna elements for controlling directivity, comprising:
  a receiver;
  a transmitter;
  a directional coupler for sharing the antenna elements with the receiver and the transmitter;
  switching means for switching between reception and transmission; and
  digital signal processing means for digital processing, when reception, to weight each signal on amplitude and phase and add the weighted signals and when transmitting, to in-phase divide a signal for the antenna elements and weight for the split divided the signals on the amplitude and the phase, wherein the receiver comprises:

first receiving frequency converting means for converting frequencies of signals received by the plurality of antenna elements;

first analog/digital converting means for converting the signals converted by the first receiving frequency converting means into digital signals to supply the digital signals to the digital signal processing means;

first digital/analog converting means for converting the digital signal added by the digital signal processing means into an analog signal; and second receiving frequency converting means for converting a frequency of the analog signal converted by the first digital/analog converting means to an original frequency of the received signals, and the transmitter comprises:

first transmitting frequency converting means for converting a frequency of a transmitting signal;

second analog/digital converting means for converting the signal converted by the first transmitting frequency converting means into a digital signal to supply the signal to the digital signal processing means;

second digital/analog converting means for converting the digital signals weighted by the digital signal processing means into analog signals; and second transmitting frequency converting means for converting each frequency of the analog signals converted by the second digital/analog converting means to an original frequency of the transmitting signal and supplying the signals to the plurality of antenna elements.

15. A directional antenna apparatus according to claim 14, wherein said digital signal processing means includes a reference table in which the weighting coefficients for the amplitude and the phase calculated from a combination of the desired wave direction and undesired wave direction are stored, and weights on the amplitude and the phase in accordance with the weighting coefficients are stored in the reference table.

16. A directional antenna apparatus having a plurality of antenna elements for controlling directivity, comprising:

first receiving frequency converting means for converting a frequency of signals received by the antenna elements;

weighting means for weighting the signals converted by the first receiving frequency converting means on amplitude and phase;

adding means for adding the signals weighted by the weighting means; and second receiving frequency converting means for converting the signal added by the adding means with the use of a local oscillator which variably sets a frequency.

17. A directional antenna apparatus having a plurality of antenna elements for controlling directivity, comprising:

first receiving frequency converting means for converting frequencies of signals received by the plurality antenna elements;

analog/digital converting means for converting the signals converted by the first receiving frequency converting means into digital signals;

digital signal processing means for digital processing to weight the digital signals converted by the analog/digital converting means on amplitude and phase;

digital/analog converting means for converting the signals weighted by the digital signal processing means into analog signals;

adding means for adding the analog signals converted by the digital/analog converting means; and second receiving frequency converting means for converting a frequency of the analog signal added by the adding means with the use of a local oscillator which variably sets a frequency.

18. A directional antenna apparatus according to claim 17, wherein said digital signal processing means includes a reference table in which weighting coefficients for the amplitude and the phase calculated from a combination of a desired wave direction and an undesired wave direction are stored, and weights on the amplitude and the phase of the digital signals in accordance with the weighting coefficients are stored in the reference table.

19. A directional antenna apparatus having a plurality of antenna elements for controlling directivity, comprising:

first receiving frequency converting means for converting frequencies of signals received by the antenna elements;

analog/digital converting means for converting the signals converted by the first receiving frequency converting means into digital signals;

digital signal processing means for digital processing to weight the digital signals converted by the analog/digital converting means on an amplitude and a phase and then add the weighted digital signals;

digital/analog converting means for converting the digital signal added by the digital signal processing means into the analog signal; and second receiving frequency converting means for converting a frequency of the analog signal converted by the digital/analog converting means with the use of a local oscillator which variably sets a frequency.

20. A directional antenna apparatus according to claim 19, wherein said digital signal processing means includes a reference table in which weighting coefficients for an amplitude and the phase calculated from a combination of the desired wave direction and an undesired wave direction are stored, and weights on the amplitude and the phase in accordance with the weighting coefficients are stored in the reference table.

21. A directional antenna apparatus having a plurality of antenna elements for controlling directivity, comprising:

first receiving frequency converting means for converting frequencies of signals received by the plurality of antenna elements;

weighting means for weighting the signals converted by the first receiving frequency converting means on an amplitude and a phase;

adding means for adding the signals weighted by the weighting means; and second receiving frequency converting means for converting a frequency of the signal added by the adding means with the use of a frequency signal from an external source.

22. A directional antenna apparatus having a plurality of antenna elements for controlling directivity, comprising:

first transmitting frequency converting means for converting a predetermined frequency of a signal at an optional position in a transmitter with the use of a local oscillator which variably sets a frequency;

in-phase dividing means for in-phase dividing the signal converted by the first transmitting frequency converting means for the plurality of antenna elements;

weighting means for weighting the signals in-phase divided by the in-phase dividing means on an amplitude and a phase; and second transmitting frequency converting means for converting each frequency of the signals weighted by the weighting means to an original frequency of a transmitting signal and supplying the signals to the plurality of antenna elements.

23. A directional antenna apparatus having a plurality of antenna elements for controlling directivity, comprising:

first transmitting frequency converting means for converting a predetermined frequency of a signal at an optional position in a transmitter with the use of a local oscillator which variably sets a frequency;

in-phase dividing means for in-phase dividing the signal converted by the first transmitting frequency converting means for the plurality of antenna elements;

analog/digital converting means for converting the signals in-phase divided by the in-phase dividing means into digital signals;

digital signal processing means for digital processing to weight the digital signals converted by the analog/digital converting means on an amplitude and a phase;

digital/analog converting means for converting the signals weighted by the digital signal processing means into analog signals; and second transmitting frequency converting means for converting each frequency of the analog signals to an original frequency of a transmitting signal and supplying the signals to the plurality of antenna elements.

24. A directional antenna apparatus according to claim 23, wherein said digital signal processing means includes a reference table in which weighting coefficients for the amplitude and the phase calculated from a combination of a desired wave direction and an undesired wave direction are stored, and weights on the amplitude and the phase in accordance with the weighting coefficients are stored in the reference table.

25. A directional antenna apparatus having a plurality of antenna elements for controlling directivity, comprising:

first transmitting frequency converting means for converting a predetermined frequency of a signal at an optional position in a transmitter with the use of a local oscillator which variably sets a frequency;

analog/digital converting means for converting the signals converted by the first transmitting frequency converting means into digital signals;

digital signal processing means for digital processing to in-phase split the digital signal converted by the analog/digital converting means for the plurality of antenna elements and then weights the in-phase divided signal on an amplitude and a phase;

digital/analog converting means for converting the digital signals weighted by the digital signal processing unit into analog signals; and second transmitting frequency converting means for converting each frequency of the analog signals converted by the digital/analog converting means to an original frequency of a transmitting signal and supplying the signals to the plurality of antenna elements.

26. A directional antenna apparatus according to claim 25, wherein said digital signal processing means includes a reference table in which weighting coefficients for the amplitude and the phase calculated from a combination of a desired wave direction and an undesired wave direction are stored, and weights on the amplitude and the phase in accordance with the weighting coefficients are stored in the reference table.

27. A directional antenna apparatus having a plurality of antenna elements for controlling directivity, comprising:

first receiving frequency converting means for converting a frequency of signals received by the plurality of antenna elements;

weighting means for weighting the signals converted by the first receiving frequency converting means on an amplitude and a phase;

adding means for adding the signals weighted by the weighting means;

second receiving frequency converting means for converting the signal added by the adding means with the use of a local oscillator which variably sets a frequency;

first transmitting frequency converting means for converting a predetermined frequency of a signal at an optional position in a transmitter with the use of a local oscillator which variably sets a frequency;

in-phase dividing means for in-phase dividing the signal converted by the first transmitting frequency converting means for the plurality of antenna elements;

weighting means for weighting the signals in-phase divided by the in-phase dividing means on the amplitude and the phase; and second transmitting frequency converting means for converting each frequency of the signals weighted by the weighting means to an original frequency of a transmitting signal and supplying the signals to the plurality of antenna elements.

28. A directional antenna apparatus having a plurality of antenna elements for controlling the directivity, comprising:

a receiver;

a transmitter;

a directional coupler for sharing the antenna elements with the receiver and the transmitter; and digital signal processing means for digital processing to weight signals on the amplitude and the phase, wherein the receiver comprises:

first receiving frequency converting means for converting the signals received by the plurality of antenna elements;

first analog/digital converting means for converting the signals weighted by the first receiving frequency converting means into digital signals and supplying the signals to the digital signal processing means;

first digital/analog converting means for converting the signals weighted by the digital signal processing means into analog signals;

adding means for adding the analog signals converted by the first digital/analog converting means; and second receiving frequency converting means for converting a frequency of the signal added by the adding means with the use of a local oscillator of a variable frequency type, and wherein the transmitter comprises:

first transmitting frequency converting means for converting a predetermined frequency of a signal at an optional position in the transmitter with the use of a local oscillator which variably sets a frequency;

in-phase dividing means for in-phase dividing the signal converted by the first transmitting frequency converting means for the plurality of antenna elements;

second analog/digital converting means for converting the signals in-phase divided by the in-phase dividing means into digital signals and supplying the digital signals to the digital signal processing means;

second digital/analog converting means for converting the digital signals weighted by the digital signal processing means into analog signals; and second transmitting frequency converting means for converting each frequency of the analog signals to an original frequency of a transmitting signal and supplying the signals to the plurality of antenna elements.

29. A directional antenna apparatus according to claim 28, wherein said digital signal processing means includes a reference table in which weighting coefficients for the amplitude and the phase calculated from a combination of a desired wave direction and an undesired wave direction are stored, and weights on the amplitude and the phase in accordance with the weighting coefficients are stored in the reference table.

30. A directional antenna apparatus according to claim 28, wherein the receiver has a receiver interface which comprises:

first radio transmitting means for converting the signal converted by the second receiving frequency converting means into a radio signal for transmission; and first radio receiving means for receiving the radio signal from the first radio transmitting means and converting the radio signal to an electric signal to output to the outside, and wherein the transmitter has a transmitter interface which comprises:

second radio transmitting means for converting an input signal from the outside into a radio signal and transmitting the radio signal; and second radio receiving means for receiving the radio signal transmitted from the second radio transmitting means and converting the radio signal to an electric signal and supplying the electric signal to the first transmitting frequency converting means.

31. A directional antenna apparatus having a plurality of antenna elements for controlling directivity, comprising:

a receiver;

a transmitter;

a directional coupler for sharing the antenna elements with the receiver and the transmitter; and digital signal processing means for digital processing, when reception, to weight signals on an amplitude and a phase and add the weighted signals and when transmission, to in-phase divide a transmitting signal for the plurality of antenna elements and weight each of the divided signals on the amplitude and the phase, wherein the receiver comprises:

first receiving frequency converting means for converting the frequency of signals received by the plurality of antenna elements;

first analog/digital converting means for converting the signals converted by the first receiving frequency converting means into digital signals and supplying the digital signals to the digital signal processing means;

first digital/analog converting means for converting the digital signal added by the digital signal processing means into an analog signal; and second receiving frequency converting means for converting a frequency of the analog signal converted by the first digital/analog converting means with the use of a local oscillator which variably sets a frequency, and wherein the transmitter comprises:

first transmitting frequency converting means for converting a predetermined frequency of a signal at an optional position in the transmitter with the use of a local oscillator which variably sets a frequency;

second analog/digital converting means for converting a signal converted by the first transmitting frequency converting means into a digital signal and supplying the digital signal to the digital signal processing means;

second digital/analog converting means for converting the digital signals weighted by the digital signal processing means into analog signals; and second transmitting frequency converting means for converting each frequency of the analog signals to an original frequency of transmitting and supplying the analog signals to the plurality of antenna elements.

32. A directional antenna apparatus according to claim 31, wherein said digital signal processing means includes a reference table in which weighting coefficients for the amplitude and the phase calculated from a combination of a desired wave direction and an undesired wave direction are stored, and weights on the amplitude and the phase in accordance with the weighting coefficients are stored in the reference table.

33. A directional antenna apparatus according to claim 31, wherein the receiver has a receiver interface which comprises:

first radio transmitting means for converting the analog signal converted by the second receiving frequency converting means into a radio signal for transmission; and first radio receiving means for receiving the radio signal from the first radio transmitting means and converting the radio signal to an electric signal to output to the outside, and wherein the transmitter has a transmitter interface which comprises:

second radio transmitting means for converting an input signal from the outside into a radio signal and transmitting the radio signal; and second radio receiving means for receiving the radio signal from the second radio transmitting means and converting the received radio signal to an electric signal and supplying the electric signal to the first transmitting frequency converting means.

* * * * *